(12) United States Patent
Raghavan et al.

(10) Patent No.: US 11,575,421 B2
(45) Date of Patent: Feb. 7, 2023

(54) TECHNIQUES FOR BEAM SHAPING FOR IN-BAND INTERFERENCE MITIGATION IN LARGE BANDWIDTH MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/116,247

(22) Filed: Dec. 9, 2020

(65) Prior Publication Data
US 2022/0182116 A1     Jun. 9, 2022

(51) Int. Cl.
*H04B 7/06*     (2006.01)
*H04B 17/336*     (2015.01)
*G01S 19/21*     (2010.01)
*H04B 7/0417*     (2017.01)
*H04B 7/08*     (2006.01)

(52) U.S. Cl.
CPC ............ *H04B 7/0617* (2013.01); *G01S 19/21* (2013.01); *H04B 7/0417* (2013.01); *H04B 7/0857* (2013.01); *H04B 17/336* (2015.01)

(58) Field of Classification Search
CPC .. H04B 7/0617; H04B 7/0417; H04B 7/0857; H04B 17/336; G01S 19/21
See application file for complete search history.

(56) References Cited

U.S. PATENT DOCUMENTS

| 2011/0319092 A1 | 12/2011 | Kim et al. |
| 2018/0269946 A1 | 9/2018 | Choi et al. |
| 2022/0095256 A1* | 3/2022 | Lee .......................... G01S 19/24 |

OTHER PUBLICATIONS

International Search Report and Written Opinion—PCT/US2021/072327—ISA/EPO—dated Apr. 25, 2022.
Partial International Search Report—PCT/US2021/072327—ISA/EPO—dated Mar. 1, 2022.

* cited by examiner

*Primary Examiner* — Minh Trang T Nguyen
(74) *Attorney, Agent, or Firm* — Holland & Hart LLP

(57) ABSTRACT

Methods, systems, and devices for wireless communications are described. A first base station may receive, from a plurality of user equipments (UEs), a plurality of uplink signals that include feedback information for the plurality of UEs. A first UE of the plurality of UEs may be associated with the first base station and a second UE of the plurality of UEs may be associated with a second base station. The first base station may modify a plurality of sets of beam weights for a plurality of downlink signals, where each modified set of beam weights corresponds to a respective downlink signal of the plurality of downlink signals. The first base station may transmit, to the first UE, a first downlink signal of the plurality of downlink signals using a first modified set of beam weights of the of the plurality of sets of beam weights.

23 Claims, 18 Drawing Sheets

TECHNIQUES FOR BEAM SHAPING FOR IN-BAND INTERFERENCE MITIGATION IN LARGE BANDWIDTH MILLIMETER WAVE SYSTEMS

FIELD OF DISCLOSURE

The present disclosure, for example, relates to wireless communications, more particularly to techniques for beam shaping for in-band interference mitigation in large bandwidth millimeter wave systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may include one or more base stations communicating with a plurality of UEs. In some examples, communications between the base station and a first UE of the plurality UEs may create interference at a second UE of the plurality of UEs, and the base station may attempt to mitigate the interference experienced at the second UE of the plurality of UEs. Some techniques for mitigating interference, however, may be deficient in some implementations.

SUMMARY

The described techniques relate to improved methods, systems, devices, and apparatuses that support techniques for beam shaping for in-band interference mitigation in large bandwidth millimeter wave systems. For example, the described techniques provide reducing side lobe interference in a wireless communications system. In some examples, a first base station may receive, from a plurality of user equipments (UEs), a plurality of uplink signals that include feedback information for the plurality of UEs. A first UE of the plurality of UEs may be associated with the first base station and a second UE of the plurality of UEs may be associated with a second base station. In some cases, the first base station may be the same as the second base station, while in some other cases, the first base station may be different from the second base station. The first base station may modify a plurality of sets of beam weights for a plurality of downlink signals, where each modified set of beam weights corresponds to a respective downlink signal of the plurality of downlink signals. The first base station may transmit, to the first UE, a first downlink signal of the plurality of downlink signals using a first modified set of beam weights of the plurality of sets of beam weights.

An apparatus for wireless communication at a UE associated with a first base station is described. The apparatus may include a processor, memory in electronic communication with the processor, and instructions stored in the memory. The instructions may be executable by the processor to cause the apparatus to receive, from the first base station based on a first set of beam weights, a control signal requesting feedback information, where the control signal is associated with a second base station and transmit, in response to receiving the control signal, a feedback signal to the first base station, the feedback signal being associated with the second base station.

Another apparatus for wireless communication at a UE associated with a first base station is described. The apparatus may include means for receiving, from the first base station based on a first set of beam weights, a control signal requesting feedback information, where the control signal is associated with a second base station and means for transmitting, in response to receiving the control signal, a feedback signal to the first base station, the feedback signal being associated with the second base station.

A non-transitory computer-readable medium storing code for wireless communication at a UE associated with a first base station is described. The code may include instructions executable by a processor to receive, from the first base station based on a first set of beam weights, a control signal requesting feedback information, where the control signal is associated with a second base station and transmit, in response to receiving the control signal, a feedback signal to the first base station, the feedback signal being associated with the second base station.

Some examples of the method, apparatuses, and non-transitory computer-readable medium described herein may further include operations, features, means, or instructions for receiving, from the first base station, a downlink signal according to a second set of beam weights different from the first set of beam weights, where the second set of beam weights may be based on the feedback signal.

Some examples of the method, apparatuses, and non-transitory computer-readable medium described herein may further include operations, features, means, or instructions for determining a signal to interference and noise ratio (SINR), where the feedback signal includes the SINR.

Some examples of the method, apparatuses, and non-transitory computer-readable medium described herein may further include operations, features, means, or instructions for determining location information corresponding to the UE, where the feedback signal includes the location information.

Some examples of the method, apparatuses, and non-transitory computer-readable medium described herein may further include operations, features, means, or instructions for receiving, from the first base station, a global navigation satellite systems (GNSS) signal, where the location information may be based on the GNSS signal.

Some examples of the method, apparatuses, and non-transitory computer-readable medium described herein may further include operations, features, means, or instructions for receiving, from the first base station, a terrestrial beacon system (TBS) signal, where the location information may be based on the TBS signal.

A method for wireless communication at a first base station is described. The method may include receiving, from a set of multiple UEs, a set of multiple uplink signals including feedback information for the set of multiple UEs, where a first UE of the set of multiple UEs is associated with the first base station and a second UE of the set of multiple UEs is associated with a second base station, modifying a set of multiple sets of beam weights for a set of multiple downlink signals, each modified set of beam weights of the set of multiple sets of beam weights corresponding to a respective downlink signal of the set of multiple downlink signals, and transmitting, to the first UE, a first downlink signal of the set of multiple downlink signals using a first modified set of beam weights of the of the set of multiple sets of beam weights.

An apparatus for wireless communication at a first base station is described. The apparatus may include a processor, memory in electronic communication with the processor, and instructions stored in the memory. The instructions may be executable by the processor to cause the apparatus to receive, from a set of multiple UEs, a set of multiple uplink signals including feedback information for the set of multiple UEs, where a first UE of the set of multiple UEs is associated with the first base station and a second UE of the set of multiple UEs is associated with a second base station, modify a set of multiple sets of beam weights for a set of multiple downlink signals, each modified set of beam weights of the set of multiple sets of beam weights corresponding to a respective downlink signal of the set of multiple downlink signals, and transmit, to the first UE, a first downlink signal of the set of multiple downlink signals using a first modified set of beam weights of the of the set of multiple sets of beam weights.

Another apparatus for wireless communication at a first base station is described. The apparatus may include means for receiving, from a set of multiple UEs, a set of multiple uplink signals including feedback information for the set of multiple UEs, where a first UE of the set of multiple UEs is associated with the first base station and a second UE of the set of multiple UEs is associated with a second base station, means for modifying a set of multiple sets of beam weights for a set of multiple downlink signals, each modified set of beam weights of the set of multiple sets of beam weights corresponding to a respective downlink signal of the set of multiple downlink signals, and means for transmitting, to the first UE, a first downlink signal of the set of multiple downlink signals using a first modified set of beam weights of the of the set of multiple sets of beam weights.

A non-transitory computer-readable medium storing code for wireless communication at a first base station is described. The code may include instructions executable by a processor to receive, from a set of multiple UEs, a set of multiple uplink signals including feedback information for the set of multiple UEs, where a first UE of the set of multiple UEs is associated with the first base station and a second UE of the set of multiple UEs is associated with a second base station, modify a set of multiple sets of beam weights for a set of multiple downlink signals, each modified set of beam weights of the set of multiple sets of beam weights corresponding to a respective downlink signal of the set of multiple downlink signals, and transmit, to the first UE, a first downlink signal of the set of multiple downlink signals using a first modified set of beam weights of the of the set of multiple sets of beam weights.

Some examples of the method, apparatuses, and non-transitory computer-readable medium described herein may further include operations, features, means, or instructions for transmitting, to one or more UEs of the set of multiple UEs, a first feedback information request signal, where receiving the set of multiple uplink signals including the feedback information may be based on the first feedback information request signal.

Some examples of the method, apparatuses, and non-transitory computer-readable medium described herein may further include operations, features, means, or instructions for transmitting, to the second base station, a second feedback information request signal associated with one or more UEs of the set of multiple UEs, where receiving the set of multiple uplink signals including the feedback information may be based on the second feedback information request signal.

Some examples of the method, apparatuses, and non-transitory computer-readable medium described herein may further include operations, features, means, or instructions for determining an angle of arrival spread corresponding to a dominant cluster or path of a first uplink signal of the set of multiple uplink signals, where modifying the set of multiple sets of beam weights may be based on the angle of arrival spread, and where modifying the set of multiple sets of beam weights includes mitigating a side lobe level associated with an interference condition associated with the second UE of the set of multiple UEs.

Some examples of the method, apparatuses, and non-transitory computer-readable medium described herein may further include operations, features, means, or instructions for determining, based on the feedback information, an interference condition associated with the second UE of the set of multiple UEs, where modifying the set of multiple sets of beam weights may be based on the interference condition, and where modifying the set of multiple sets of beam weights includes mitigating a side lobe level associated with the interference condition.

Some examples of the method, apparatuses, and non-transitory computer-readable medium described herein may further include operations, features, means, or instructions for receiving, from the first UE of the set of multiple UEs, a first uplink signal of the set of multiple uplink signals in a radio frequency spectrum region and receiving, from the second UE of the set of multiple UEs, a second uplink signal of the set of multiple uplink signals in the radio frequency spectrum region.

In some examples of the method, apparatuses, and non-transitory computer-readable medium described herein, the feedback information includes an SINR corresponding to at least one UE of the set of multiple UEs.

In some examples of the method, apparatuses, and non-transitory computer-readable medium described herein, the feedback information includes location information corresponding to at least one UE of the set of multiple UEs.

In some examples of the method, apparatuses, and non-transitory computer-readable medium described herein, the set of multiple uplink signals include at least one beam change request.

DETAILED DESCRIPTION

Figure 1:
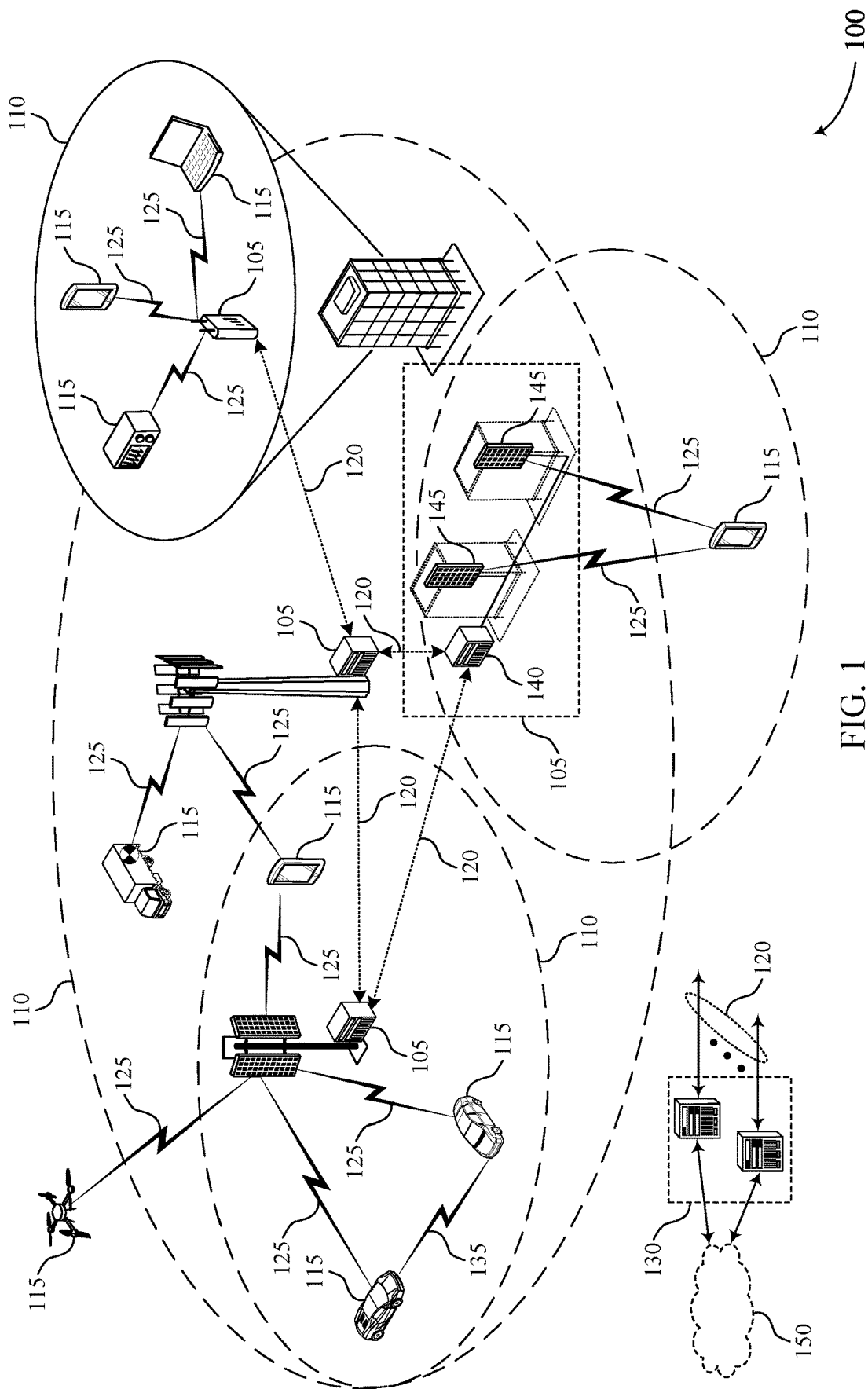
FIGS. 1 and 2 illustrate examples of wireless communications systems that support techniques for beam shaping for in-band interference mitigation in large bandwidth millimeter wave systems in accordance with aspects of the present disclosure.

In some wireless communications systems, a base station may communicate with a plurality of user equipments (UEs). In some examples, one or more UEs of the plurality of UEs may experience interference due to downlink signals transmitted by the base station. For example, the base station may transmit a downlink signal to a first UE of the plurality of UEs by directing a main lobe of a downlink beam to the first UE of the plurality of UEs, but a side lobe of the downlink beam may be directed at a second UE of the plurality of UEs, which may create interference at the second UE of the plurality of UEs. In some cases, the base station may apply a filter to the downlink beam, or the base station may alter the direction of the main lobe of the downlink beam as well as the side lobe of the downlink beam, to mitigate the interference at the second UE of the plurality of UEs. This may, however, fail to mitigate interference in a wireless communications system. For example, the filter may fail to reduce the interference at the second UE of the plurality of UEs when the first UE of the plurality of UEs and the second UE of the plurality of UEs are operating in a same radio frequency spectrum band, and modifying the direction of the main lobe of a downlink beam may create interference at additional UEs in the wireless communications system.

Various aspects of the present disclosure provide techniques for mitigating interference at a UE in the context of a plurality of UEs operating in close proximity to one another, or in the context of the plurality of UEs operating in the same radio frequency spectrum band. For example, each UE of the plurality of UEs may transmit an uplink signal that includes feedback information (e.g., a signal to interference and noise ratio (SINR)) to the base station, and the base station may modify a set of beam weights for a downlink signal based on the feedback information. In some examples, the base station may transmit a first downlink signal to a first UE of the plurality of UEs using a set of beam weights, modify the set of beam weights associated with the first downlink signal based on the feedback information, and transmit a second downlink signal to the first UE of the plurality of UEs using the modified set of beam weights. Modifying a set of beam weights for a downlink signal based on feedback information received from a plurality of UEs may reduce interference in dense wireless communications systems (e.g., small cells) and in wireless communications systems where multiple UEs are operating in the same radio frequency spectrum band.

Such techniques may include modifying one or more sets of beam weights based on feedback information received from a plurality of UEs. In some examples, the feedback information may include an indication of an interference level (e.g., an SINR), a request for different communication resources (e.g., a beam change request), location information, or a combination thereof. For example, the base station may transmit a first downlink signal to a first UE of a plurality of UEs based on a set of beam weights, receive a plurality of uplink signals that include feedback information for the plurality of UEs, and modify one or more sets of beam weights based on the plurality of uplink signals. A main lobe of the first downlink signal may be directed at the first UE of the plurality of UEs and a side lobe of the first downlink signal directed at a second UE of the plurality of UEs may be mitigated. The base station may identify an interference condition corresponding to the side lobe of the first downlink signal, modify the set of beam weights based on identifying the interference condition, and transmit a second downlink signal to the first UE of the plurality of UEs based on the modified set of beam weights. The modified set of beam weights may direct a main lobe of the second downlink signal to the first UE while also mitigating a side lobe of the second downlink signal to the second UE of the plurality of UEs.

Aspects of the disclosure are initially described in the context of wireless communications systems. Additional aspects are then described in the context of beam weight modification techniques, a beam modification technique, and a process flow. Aspects of the disclosure are further illustrated by and described with reference to apparatus diagrams, system diagrams, and flowcharts that relate to techniques for beam shaping for in-band interference mitigation in large bandwidth millimeter wave systems.

FIG. 1 illustrates an example of a wireless communications system 100 that supports techniques for beam shaping for in-band interference mitigation in large bandwidth millimeter wave systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may use a large antenna array in multiple frequency regions (FRs), such as FR2 and F4. The large antenna array may be used for operating over a large (e.g., an ultrawide) bandwidth, such as "over the 60 GHz band," covering the 57 GHz through 71 GHz region. The base station 105 may use beamforming to improve link margins that may be deteriorated due to path, penetration, and blockage losses. The base station 105 may utilize beamforming to steer beams in one or more directions, and the base station 105 may perform beam scanning to determine a set of beam weights corresponding to a beam that may be used to establish a link. In some examples, the base station 105 may use a DFT beam that creates a side lobe of approximately 13.5 decibels (dBs) from the main lobe (peak array gain direction).

In some cases, antenna array elements may be spaced according to an inter-element spacing. For example, if the inter-element spacing is 2.5 millimeters (mm) (e.g., $\lambda/2$ for 60 GHz), then the inter-element spacing may be $0.95*\lambda/2$ at 57 GHz and $1.18*\lambda/2$ at 71 GHz. Additionally, even if operation over the 57 GHz through 71 GHz region is not considered, interference in out-of-band scenarios (e.g., 54-57 GHz band or 71-74 GHz band) may be considered, which may be subject to effective isotropic sensitivity (EIS) constraints at a target node (e.g., a UE experiencing side lobe interference). The base station 105 may determine a set of beam weights for a carrier frequency (e.g., 60 GHz), but the set of beam weights may be mismatched to other carrier frequencies. To mitigate such a mismatch, the base station 105 may alter an array gain direction (e.g., a main lobe direction or a side lobe direction), but additional or unnecessary gain may arise in unintended directions, which may create interference at a UE 105 that is located in the unintended direction. The techniques described herein mitigate interference in large or ultrawide bandwidth wireless communications systems by using feedback information from a plurality of UEs 115 to modify one or more sets of beams weights corresponding to one or more downlink signals.

For example, a first base station 105 may receive, from a plurality of UEs 115, a plurality of uplink signals that include feedback information for the plurality of UEs 115. A first UE 115 of the plurality of UEs 115 may be associated with the first base station and a second UE 115 of the plurality of UEs 115 may be associated with a second base station. The first base station may modify a plurality of sets of beam weights for a plurality of downlink signals, where each modified set of beam weights corresponds to a respective downlink signal of the plurality of downlink signals. The first base station may transmit, to the first UE 115, a first downlink signal of the plurality of downlink signals using a first modified set of beam weights of the plurality of sets of beam weights.

Figure 2:
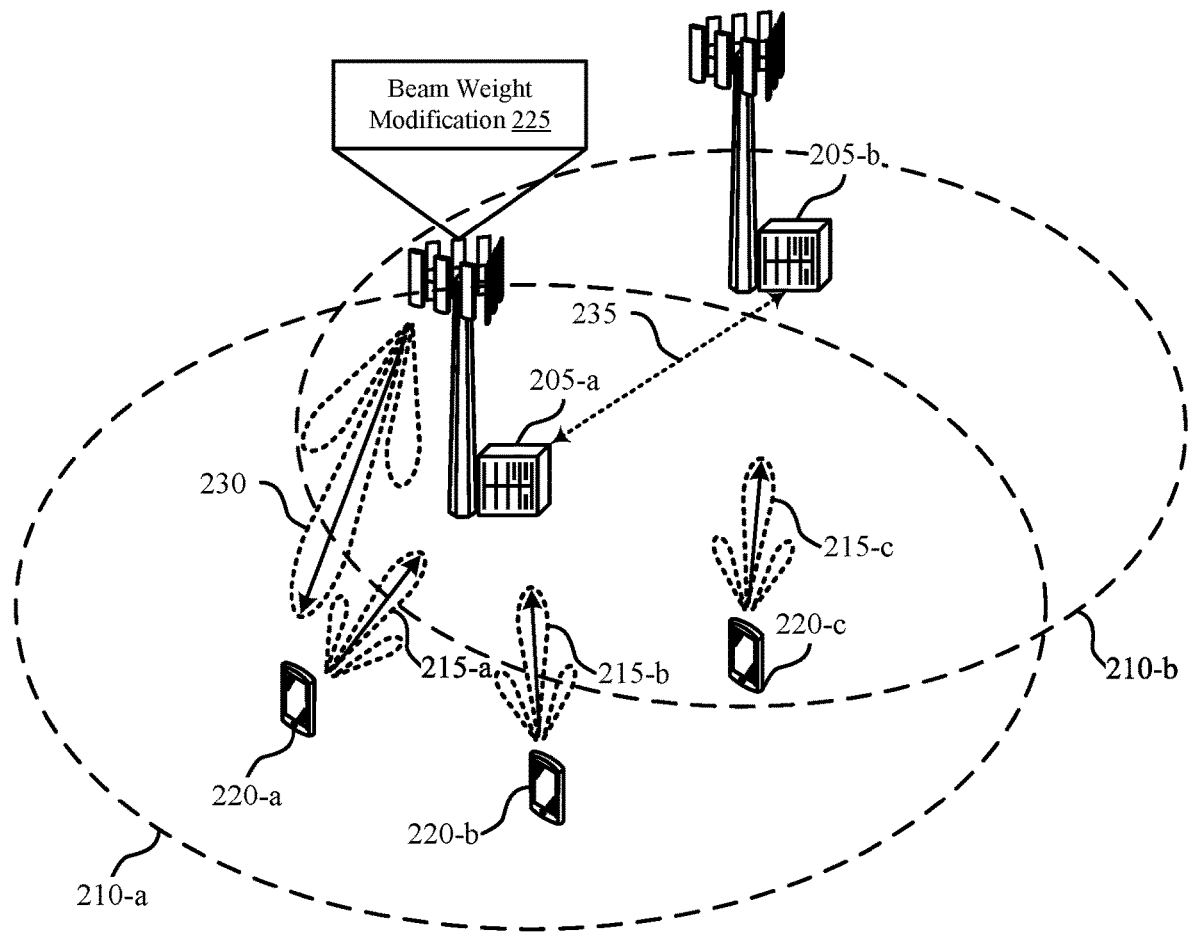

FIG. 2 illustrates an example of a wireless communications system 200 that supports techniques for beam shaping for in-band interference mitigation in large bandwidth millimeter wave systems in accordance with aspects of the present disclosure. In some examples, wireless communications system 200 may implement aspects of wireless communications system 100. For example, wireless communications system 200 may include base station 205-a and base station 205-b, which may be examples of the corresponding devices as described with reference to FIG. 1. Base station 205-a may be associated with coverage area 210-a, and base station 205-b may be associated with a coverage area 210-b. The wireless communications system 200 may also include a plurality of UEs 220.

UE 220-a and UE 220-b may be associated with base station 205-a (e.g., connected to base station 205-a), and UE 220-c may be associated with base station 205-b (e.g., connected to base station 205-b). In some cases, base station 205-a and base station 205-b may communicate via a backhaul link 235 (e.g., a physical backhaul link or a virtual backhaul link). A plurality of UEs 220 may operate within a same radio frequency band, and the plurality of UEs 220 may communicate with a same base station or with different base stations. It should be understood that wireless communications system 200 includes three UEs 220 as an illustrative example, but the wireless communications system 200 may include any number of UEs 220.

In some cases, base station 205-a may transmit a downlink signal (e.g., a beamformed transmission) having a radiation pattern that includes a main lobe, one or more side lobes, one or more beam nulls, potential grating lobes, etc., to UE 220-a. Base station 205-a may transmit the downlink signal according to a set of beam weights, and base station 205-a may determine whether the one or more side lobes associated with the downlink signal create interference at other wireless devices, such as UE 220-b or UE 220-c. In some cases, UE 220-c may receive a downlink signal requesting feedback information, and UE 220-c may transmit feedback information to base station 205-b based on receiving the downlink signal requesting feedback information. For example, base station 205-a may transmit a downlink signal requesting feedback information (e.g., a broadcast transmission or multiple beamformed downlink transmissions) from the plurality of UEs 220, and based on receiving the downlink signal requesting feedback information, UE 220-c may transmit a feedback signal to base station 205-b, and base station 205-b may transmit the feedback signal to base station 205-a via the backhaul link 235. Base station 205-a may aggregate feedback information received from UE 220-a, UE 220-b, and via the backhaul link 235, and modify one or more sets of beam weights based on the feedback information.

In some examples, base station 205-a may receive feedback information corresponding to a plurality of uplink signals (e.g., uplink signal 215-a, uplink signal 215-b, and uplink signal 215-c) associated with a plurality of UEs (e.g., UE 220-a, UE 220-b, and UE 220-c), and base station 205-a may perform the beam weight modification 225 based on the plurality of uplink signals. In some cases, base station 205-a may receive one or more uplink signals of the plurality of uplink signals from base station 205-b via the backhaul link 235, while in some other cases, base station 205-a may receive all of the uplink signals of the plurality of uplink signals from the plurality of UEs 220.

Base station 205-a may perform the beam weight modification 225 to modify one or more sets of beams weights, which may reduce transmission interference experienced at one or more UEs 220. For example, based on the feedback information associated with the plurality of uplink signals 215, base station 205-a may determine that a side lobe of a downlink signal creates interference at UE 220-b and/or UE 220-c, and base station 205-a may perform the beam weight modification 225 based on determining that the side lobe of the downlink signal creates interference at UE 220-b and/or UE 220-c. As part of the beam weight modification 225, base station 205-a may modify one or more sets of beam weights, which may alter the gain and/or direction of the side lobe associated with the downlink signal 230, thereby reducing the interference experienced at UE 220-b and/or UE 220-c.

Base station 205-a may transmit the downlink signal 230 to UE 220-a based on a modified set of beam weights, which may reduce an interference level at UE 220-b and/or UE 220-c. In some examples, base station 205-a may modify the set of beam weights based on feedback information, such as SINRs, beam change requests, or location information, associated with the uplink signals 215. As such, base station 205-a may, in some examples, aggregate the feedback information and perform the beam weight modification 225 based on the aggregated feedback information to reduce interference in the wireless communications system 200. In some examples, the modified set of beam weights associated with the downlink signal 230 may fully or partially preserve the main lobe of the downlink signal 230 while altering the side lobe of the downlink signal 230 (e.g., preserve the main lobe with respect to a previous downlink signal and alter the side lobe with respect to the previous downlink signal), which may mitigate the interference experienced by UE 220-b and/or UE 220-c. Altering the side lobe of a downlink signal while preserving the main lobe of the downlink signal may reduce interference and improve signal reliability, particularly in a dense wireless communications system containing multiple UEs, as altering both the main lobe and the side lobe of a downlink signal may create interference at additional UEs in the wireless communications system.

Figure 3:
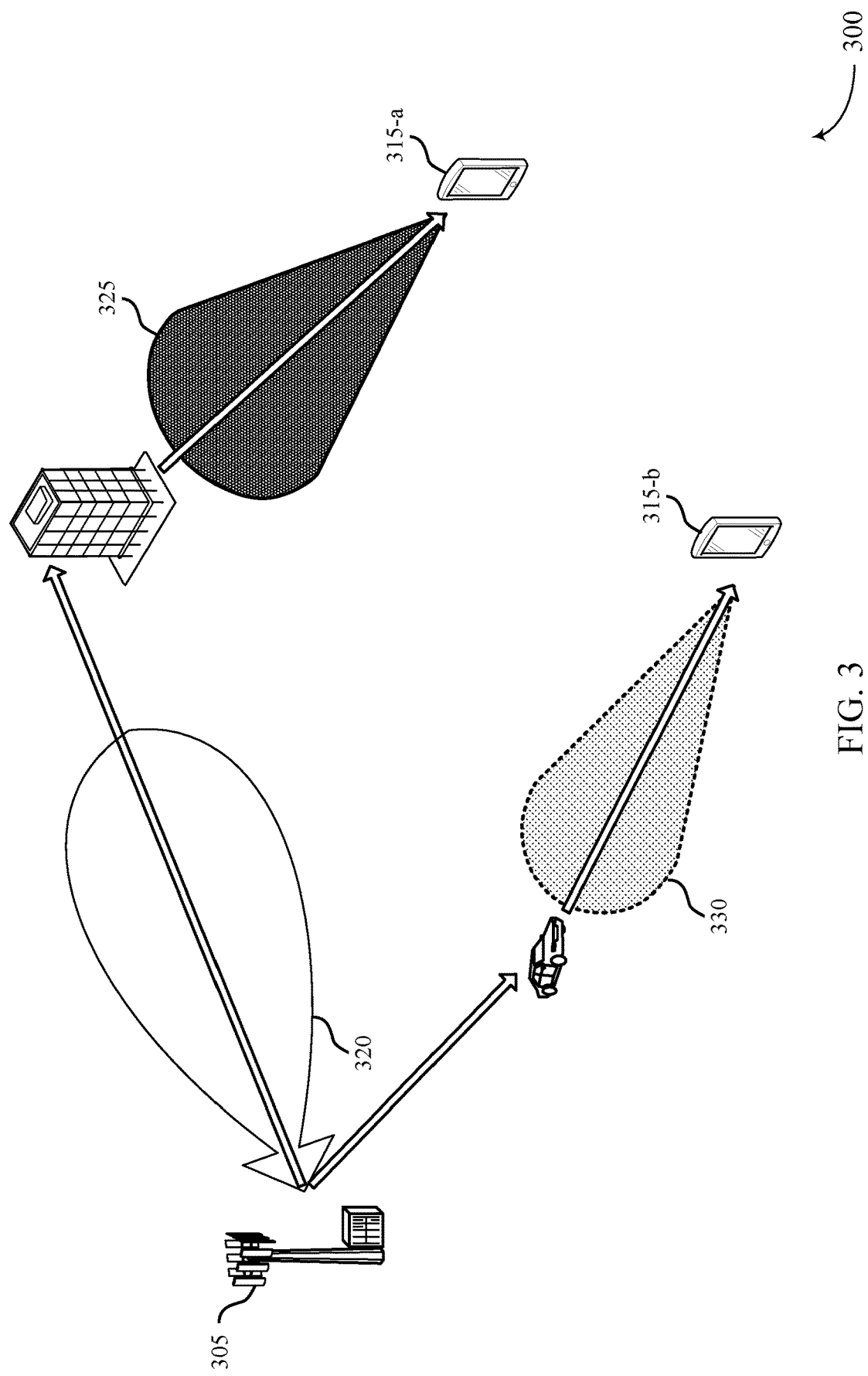
FIGS. 3 and 4 illustrate examples of beam weight modification techniques that support techniques for beam shaping for in-band interference mitigation in large bandwidth millimeter wave systems in accordance with aspects of the present disclosure.

FIG. 3 illustrates an example of a beam weight modification technique 300 that supports techniques for beam shaping for in-band interference mitigation in large bandwidth millimeter wave systems in accordance with aspects of the present disclosure. In some examples, the beam weight modification technique 300 may implement aspects of wireless communications system 100 or wireless communications system 200. For example, the beam weight modification technique 300 may include a base station 305, UE 315-a, and UE 315-b. UE 315-a may be associated with (e.g., connected to, camped on, etc.) the base station 305, and UE 315-b may be associated with the same base station 305 or a different base station. The base station 305 may transmit a downlink signal to UE 315-a via the beam 320, and the beam 320 may be based on or otherwise be associated with a set of beam weights. The beam 320 may produce a main lobe 325 and a side lobe 330. UE 315-a may decode a downlink signal based on the main lobe 325, but the side lobe 330 may create interference at UE 315-b. To mitigate the interference associated with the side lobe 330 that is experienced at UE 315-b, the base station 305 may modify the set of beam weights associated with the beam 320. In some cases, the modified set of beam weights associated with the beam 320 may alter the main lobe 325 as well as the side lobe 330, while in some other cases, the modified set of beam weights associated with the beam 320 may alter the side lobe 330 while preserving the main lobe 325.

In some examples, UE 315-a and UE 315-b may communicate with the base station 305 in different frequency bands. In such examples, the base station 305 may mitigate the interference experienced by UE 315-b by applying a filter (e.g., an antenna domain stop-band filter) to the beam 320, utilizing a radio frequency integrated circuit (RFIC), or modifying the set of beam weights associated with the beam 320 to alter the direction of the main lobe 325 and the direction of the side lobe 330. Altering the direction of the side lobe 330 may direct the side lobe 330 away from UE 315-b, thereby mitigating the interference experienced by UE 315-b. In some other examples, UE 315-a and UE 315-b may communicate with the base station 305 in the same frequency band. In such examples, the base station 305 may modify the set of beam weights associated with the beam 320 to preserve the direction of the main lobe 325 while altering the direction of the side lobe 330 to mitigate the interference experienced at UE 315-b.

Figure 4:
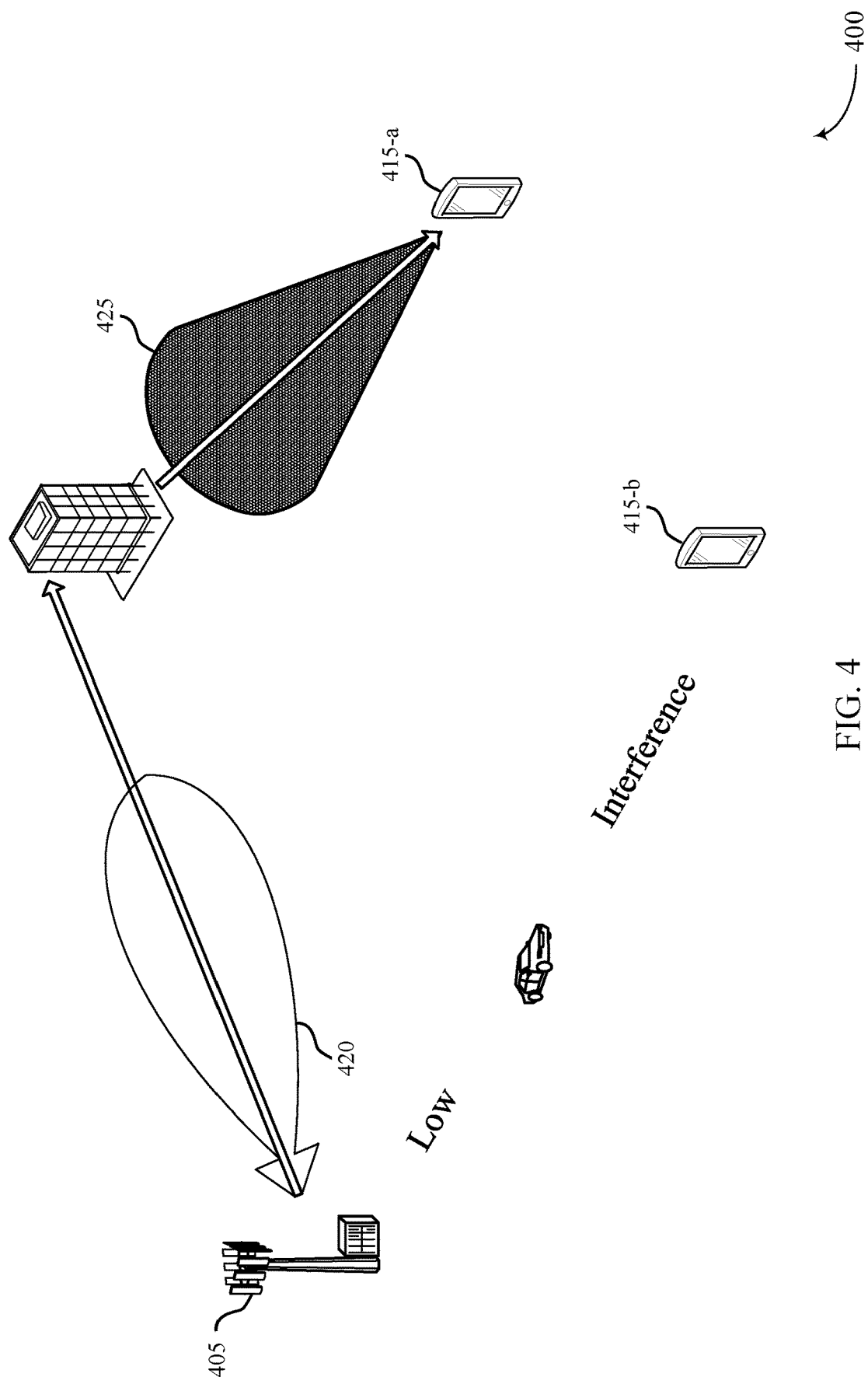

FIG. 4 illustrates an example of a beam weight modification technique 400 that supports techniques for beam shaping for in-band interference mitigation in large bandwidth millimeter wave systems in accordance with aspects of the present disclosure. In some examples, the wireless communications system 400 may implement aspects of wireless communications system 100 or wireless communications system 200. For example, the beam modification technique 400 may include a base station 405, UE 415-a, and UE 415-b. The base station 405 may transmit a modified beam 420 to UE 415-a based on a set of beam weights (e.g., a modified set of beam weights), and the modified beam 420 may produce a main lobe 425. The modified beam 420 may additionally produce a side lobe (e.g., a side lobe 330 as described with reference to FIG. 3), and the side lobe may be suppressed or directed away from UE 415-b to mitigate interference at UE 415-b.

In some examples, the base station 405 may request feedback information from UE 415-a and UE 415-b to determine whether a side lobe associated with a downlink beam causes, or poses a risk of causing, interference at UE 415-b. UE 415-a and UE 415-b may transmit uplink signals to the base station 405 based on the request for feedback information, and the uplink signals may include feedback information such as an SINR, a reference signal received power (RSRP), a beam change request, location information, or a combination thereof. The base station 405 may use the feedback information received from UE 415-a and UE 415-b to determine whether an interference condition has been satisfied. For example, the base station 405 may aggregate the feedback information and determine that a side lobe associated with the downlink beam may cause interference at UE 415-b, modify the set of beam weights associated with the downlink beam to mitigate the interference associated with the downlink beam, and transmit the modified beam 420 according to the modified set of beam weights.

In some examples, the base station 405 may use the SINR, or a function of the SINR, to determine whether the interference condition is satisfied. For example, the base station 405 may compare an average SINR value, a total SINR value, a highest SINR value, or a lowest SINR value to an interference threshold (e.g., an interference threshold configured as part of a control procedure, a dynamic interference threshold corresponding to an average interference over a period of time, etc.). When the SINR, or the function of the SINR is below the interference threshold, the base station 405 may determine that a side lobe causes interference at UE 415-b and the interference condition is satisfied, and the base station 405 may modify one or more sets of beam weights associated with one or more downlink signals to alter a side lobe of the one or more downlink signals and mitigate the interference. The base station 405 may use the location information to determine whether the interference condition is satisfied, and the location information may include UE-assisted location information, UE-based location information, or both. Modifying one or more sets of beam weights associated with one or more downlink signals may reduce interference corresponding to side lobe interference while preserving main lobe properties, which may improve the reliability of decoding downlink signals in wireless communications systems that include multiple wireless devices.

Figure 5:
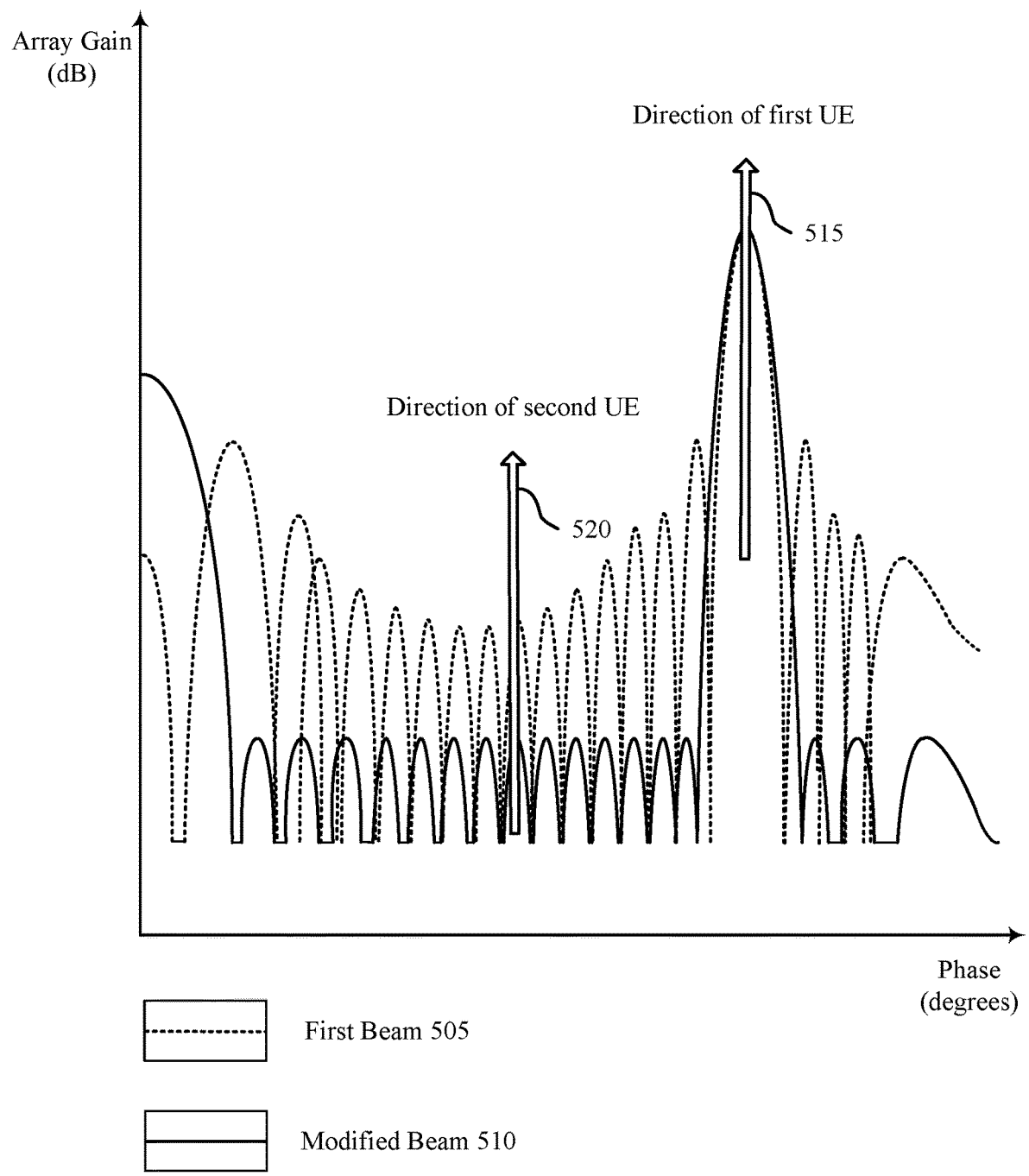
FIG. 5 illustrates an example of a beam modification technique that supports techniques for beam shaping for in-band interference mitigation in large bandwidth millimeter wave systems in accordance with aspects of the present disclosure.

FIG. 5 illustrates an example of a beam modification technique 500 that supports techniques for beam shaping for in-band interference mitigation in large bandwidth millimeter wave systems in accordance with aspects of the present disclosure. In some examples, the beam modification technique 500 may implement aspects of the wireless communications system 100 or wireless communications system 200. The beam modification technique 500 may illustrate a first beam 505 and a modified beam 510. The first beam 505 may correspond to a first set of beam weights, and the modified beam 510 may correspond to a second set of beam weights (e.g., a modified set of beam weights). The first beam 505 may include a main lobe directed towards a first UE at 515 and a side lobe directed towards a second UE at 520. A base station may generate a second set of beam weights corresponding to the modified beam 510. It should be understood that the beam modification technique 500 illustrates a non-limiting example of a beam modification technique that utilizes antenna tapering and phase shift control to mitigate interference caused by one or more side lobes of one or more beams, but additional or alternative beam modification techniques may be used to mitigate interference caused by one or more side lobes of one or more beams.

A base station may transmit a first downlink signal to a first UE via the first beam 505 based on a first set of beam weights. A main lobe of the first beam 505 may be directed at the first UE at 515, and a side lobe of the first beam 505 may be directed at a second UE at 520. In some cases, additional side lobes of the first beam 505 may be directed at additional UEs, and one or more of the side lobes of the first beam 505 may cause interference at one or more UEs. The base station may receive feedback information from a plurality of UEs, modify the first set of beam weights into a second set of beam weights that is different from the first set of beam weights, and transmit a second downlink signal to the first UE via the modified beam 510 based on the second set of beam weights. The side lobe of the modified beam 510 may be changed dramatically when compared to the side lobe of the first beam 505, but the main lobe of the modified beam 510 may be the same as, or similar to, the main lobe of the first beam 505. The modified beam 510 may utilize amplitude tapering and phase shift control to suppress or otherwise mitigate the side lobe of the first beam 505.

The modified beam 510 may be based on a modified set of beam weights, where each beam weight of the modified set of beam weights corresponds to an antenna element tuning. In other words, the modified beam 510 may be based on amplitude control to facilitate tapering, thereby suppressing a side lobe directed at the second UE at 520. In some cases, the base station may perform amplitude tapering when communicating with multiple UEs. For example, the base station may identify interference at a number of UEs based on receiving and aggregating feedback information, and the base station may mitigate the interference at some UEs or all UEs of the number of UEs by performing amplitude tapering to suppress beam side lobes.

Figure 6:
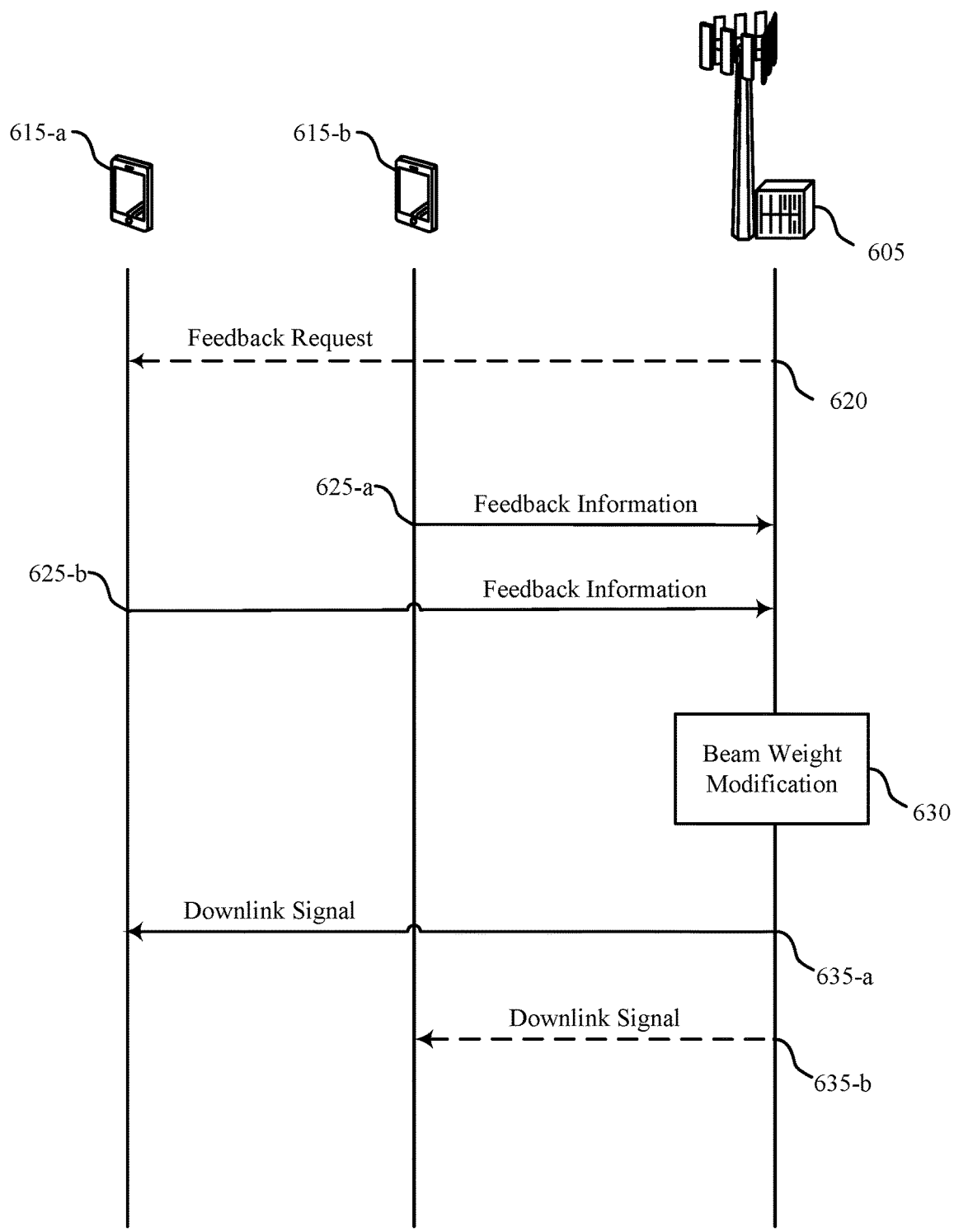
FIG. 6 illustrates an example of a process flow that supports techniques for beam shaping for in-band interference mitigation in large bandwidth millimeter wave systems in accordance with aspects of the present disclosure.

FIG. 6 illustrates an example of a process flow 600 that supports techniques for beam shaping for in-band interference mitigation in large bandwidth millimeter wave systems in accordance with aspects of the present disclosure. In some examples, the process flow 600 may implement aspects of wireless communications system 100 or wireless communications system 200. The process flow 600 includes UE 615-a, UE 615-b, and base station 605, which may be examples of the corresponding devices as described with reference to FIGS. 1 through 5. The base station 605 may receive feedback information from a plurality of UEs (e.g., UE 615-a and UE 615-b) and modify one or more sets of beam weights to mitigate side lobe interference. Alternative examples of the following may be implemented, where some steps are performed in a different order than described or are not performed at all. In some cases, steps may include additional features not mentioned below, or further steps may be added.

At 620, the base station 605 may transmit a feedback information request signal to one or more UEs. For example, the base station 605 may transmit the feedback information request signal to UE 615-a, UE 615-b, or both. In some cases, the base station 605 may transmit the feedback information request signal to an additional base station via backhaul link, and the additional base station may transmit the feedback information request signal to one or more UEs.

At 625-a, the base station 605 may receive an uplink signal from UE 615-a that includes feedback information, and at 625-b, the base station 605 may receive an uplink signal form UE 615-b that includes feedback information. In some cases, UE 615-a and UE 615-b may both be associated with the base station 605, while in some other cases, UE 615-a may be associated with the base station 605 while UE 615-b may be associated with a different base station.

At 630, the base station 605 may perform a beam weight modification procedure. In some cases, the beam weight modification procedure may include modifying a set of beam weights or generating a second set of beam weights based on a first set of beam weights. In some cases, the base station 605 may perform amplitude tapering to suppress one or more side lobes associated with one or more downlink signals, thereby reducing interference and improving signal reception reliability.

At 635-a, the base station 605 may transmit a downlink signal to UE 615-a using a first modified set of beam weights. The first modified set of beam weights may utilize amplitude tapering to reduce signal interference. At 635-b, the base station 605 may transmit a downlink signal to UE 615-b. In some cases, the downlink signal may be transmitted to UE 615-b using an unmodified set of beam weights, while in some other cases, the downlink signal may be transmitted to UE 615-b using a modified set of beam weights. Transmitting downlink signals to one or more UEs based on one or more modified sets of beam weights may improve communication efficiency by mitigating side lobe-based interference at one or more UEs.

Figure 7:
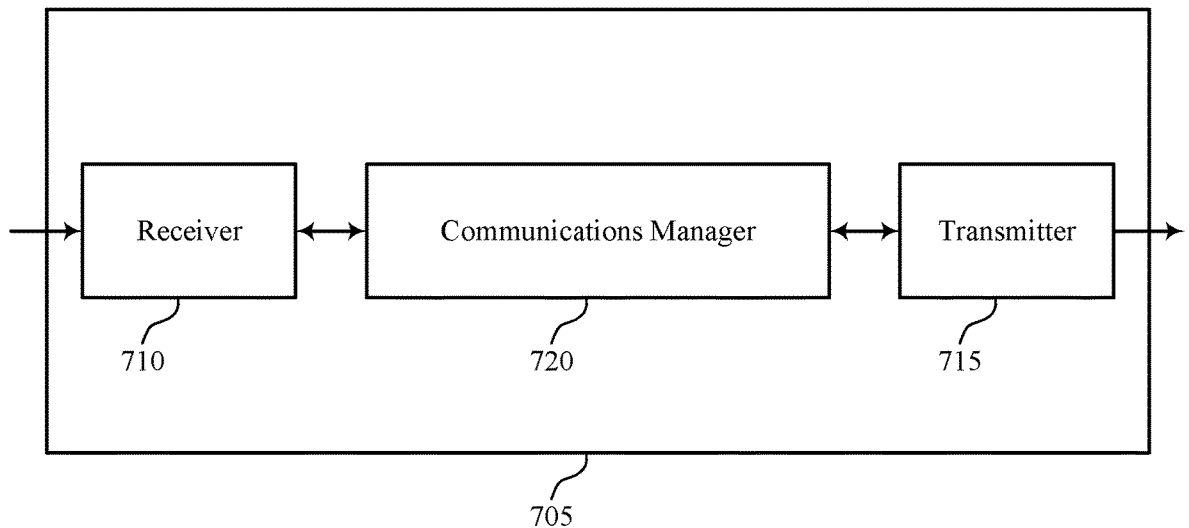
FIGS. 7 and 8 show block diagrams of devices that support techniques for beam shaping for in-band interference mitigation in large bandwidth millimeter wave systems in accordance with aspects of the present disclosure.

FIG. 7 shows a block diagram 700 of a device 705 that supports techniques for beam shaping for in-band interference mitigation in large bandwidth millimeter wave systems in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for beam shaping for in-band interference mitigation in large bandwidth millimeter wave systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for beam shaping for in-band interference mitigation in large bandwidth millimeter wave systems). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for beam shaping for in-band interference mitigation in large bandwidth millimeter wave systems as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE associated with a first base station in accordance with examples as disclosed herein. For example, the communications manager 720 may be configured as or otherwise support a means for receiving, from the first base station based on a first set of beam weights, a control signal requesting feedback information, where the control signal is associated with a second base station. In some cases, the first base station is the same as the second base station, while in some other cases, the first base station is different from the second base station. The communications manager 720 may be configured as or otherwise support a means for transmitting, in response to receiving the control signal, a feedback signal to the first base station, the feedback signal being associated with the second base station.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reliable signal decoding and reduced processing.

Figure 8:
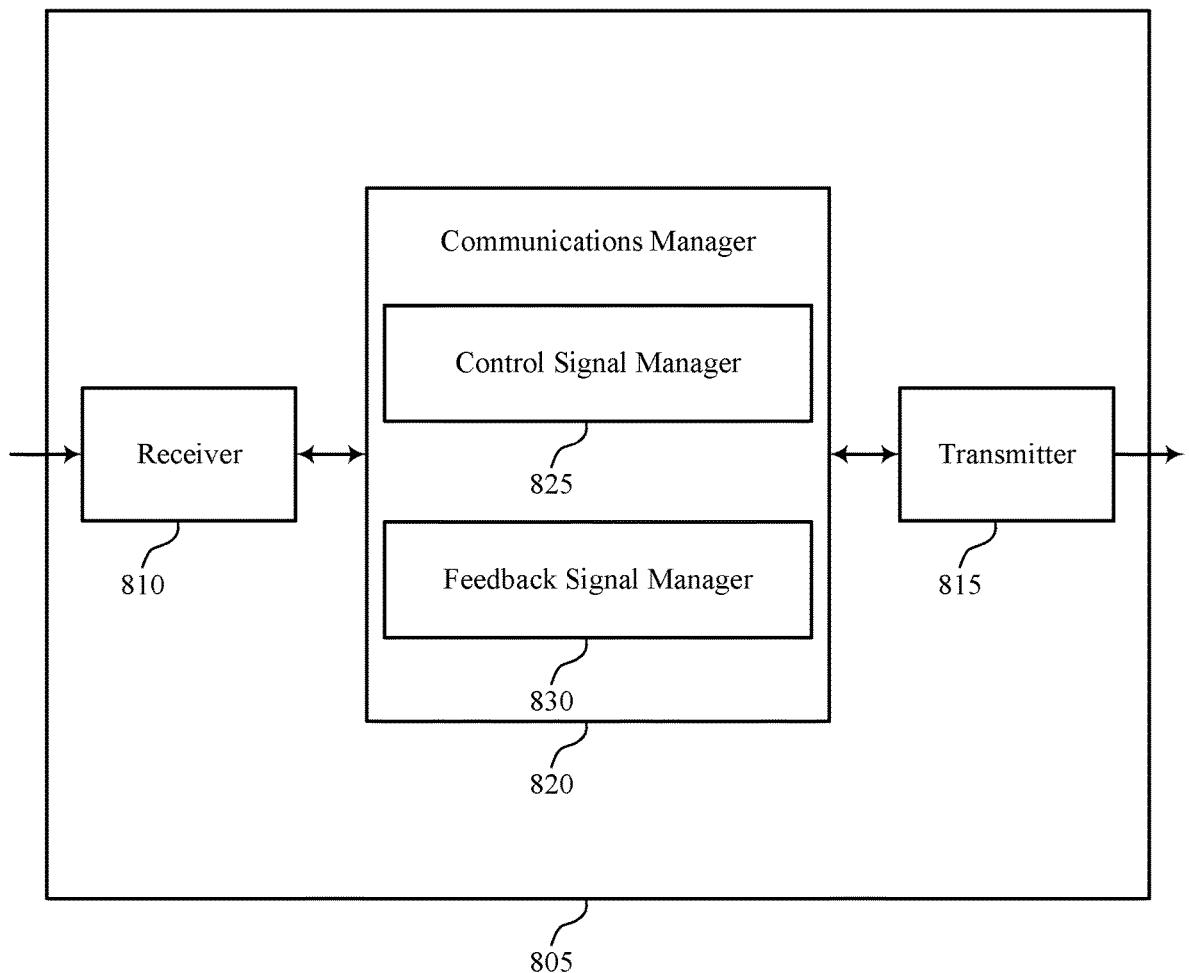

FIG. 8 shows a block diagram 800 of a device 805 that supports techniques for beam shaping for in-band interference mitigation in large bandwidth millimeter wave systems in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for beam shaping for in-band interference mitigation in large bandwidth millimeter wave systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for beam shaping for in-band interference mitigation in large bandwidth millimeter wave systems). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for beam shaping for in-band interference mitigation in large bandwidth millimeter wave systems as described herein. For example, the communications manager 820 may include a control signal manager 825 a feedback signal manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE associated with a first base station in accordance with examples as disclosed herein. The control signal manager 825 may be configured as or otherwise support a means for receiving, from the first base station based on a first set of beam weights, a control signal requesting feedback information, where the control signal is associated with a second base station. The feedback signal manager 830 may be configured as or otherwise support a means for transmitting, in response to receiving the control signal, a feedback signal to the first base station, the feedback signal being associated with the second base station.

Figure 9:
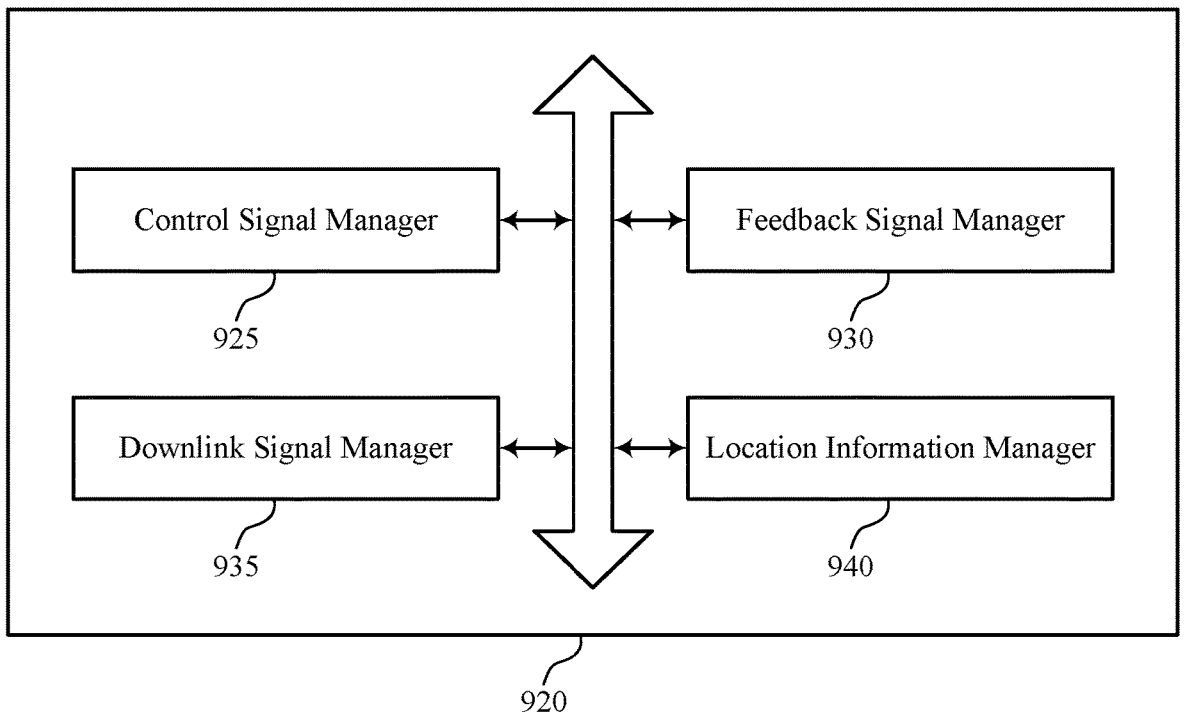
FIG. 9 shows a block diagram of a communications manager that supports techniques for beam shaping for in-band interference mitigation in large bandwidth millimeter wave systems in accordance with aspects of the present disclosure.

FIG. 9 shows a block diagram 900 of a communications manager 920 that supports techniques for beam shaping for in-band interference mitigation in large bandwidth millimeter wave systems in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for beam shaping for in-band interference mitigation in large bandwidth millimeter wave systems as described herein. For example, the communications manager 920 may include a control signal manager 925, a feedback signal manager 930, a downlink signal manager 935, a location information manager 940, or any combination thereof. Each of these components may communicate, directly or indirectly, with one another (e.g., via one or more buses).

The communications manager 920 may support wireless communication at a UE associated with a first base station in accordance with examples as disclosed herein. The control signal manager 925 may be configured as or otherwise support a means for receiving, from the first base station based on a first set of beam weights, a control signal requesting feedback information, where the control signal is associated with a second base station. The feedback signal manager 930 may be configured as or otherwise support a means for transmitting, in response to receiving the control signal, a feedback signal to the first base station, the feedback signal being associated with the second base station.

In some examples, the downlink signal manager 935 may be configured as or otherwise support a means for receiving, from the first base station, a downlink signal according to a second set of beam weights different from the first set of beam weights, where the second set of beam weights is based on the feedback signal.

In some examples, the feedback signal manager 930 may be configured as or otherwise support a means for determining an SINR, where the feedback signal includes the SINR.

In some examples, the location information manager 940 may be configured as or otherwise support a means for determining location information corresponding to the UE, where the feedback signal includes the location information.

In some examples, the location information manager 940 may be configured as or otherwise support a means for receiving, from the first base station, a global navigation satellite systems (GNSS) signal, where the location information is based on the GNSS signal.

In some examples, the location information manager 940 may be configured as or otherwise support a means for receiving, from the first base station, a terrestrial beacon system (TBS) signal, where the location information is based on the TBS signal.

Figure 10:
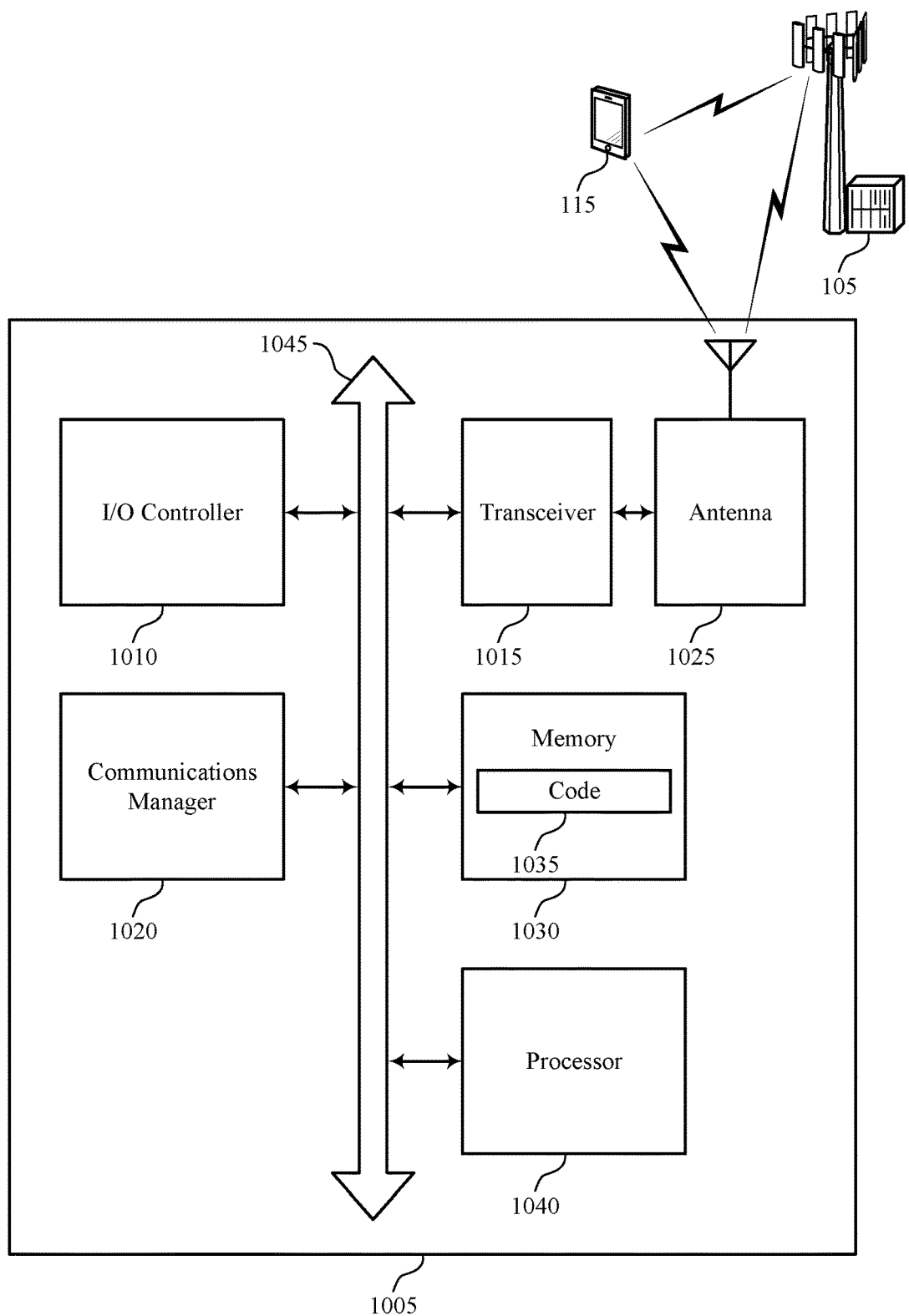
FIG. 10 shows a diagram of a system including a device that supports techniques for beam shaping for in-band interference mitigation in large bandwidth millimeter wave systems in accordance with aspects of the present disclosure.

FIG. 10 shows a diagram of a system 1000 including a device 1005 that supports techniques for beam shaping for in-band interference mitigation in large bandwidth millimeter wave systems in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025.

The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for beam shaping for in-band interference mitigation in large bandwidth millimeter wave systems). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE associated with a first base station in accordance with examples as disclosed herein. For example, the communications manager 1020 may be configured as or otherwise support a means for receiving, from the first base station based on a first set of beam weights, a control signal requesting feedback information, where the control signal is associated with a second base station. The communications manager 1020 may be configured as or otherwise support a means for transmitting, in response to receiving the control signal, a feedback signal to the first base station, the feedback signal being associated with the second base station.

By including or configuring the communications manager 1020 in accordance with examples as described herein, the device 1005 may support techniques for improved communication reliability, reduced power consumption, and reduced latency.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for beam shaping for in-band interference mitigation in large bandwidth millimeter wave systems as described herein, or the processor 1040 and the memory 1030 may be otherwise configured to perform or support such operations.

Figure 11:
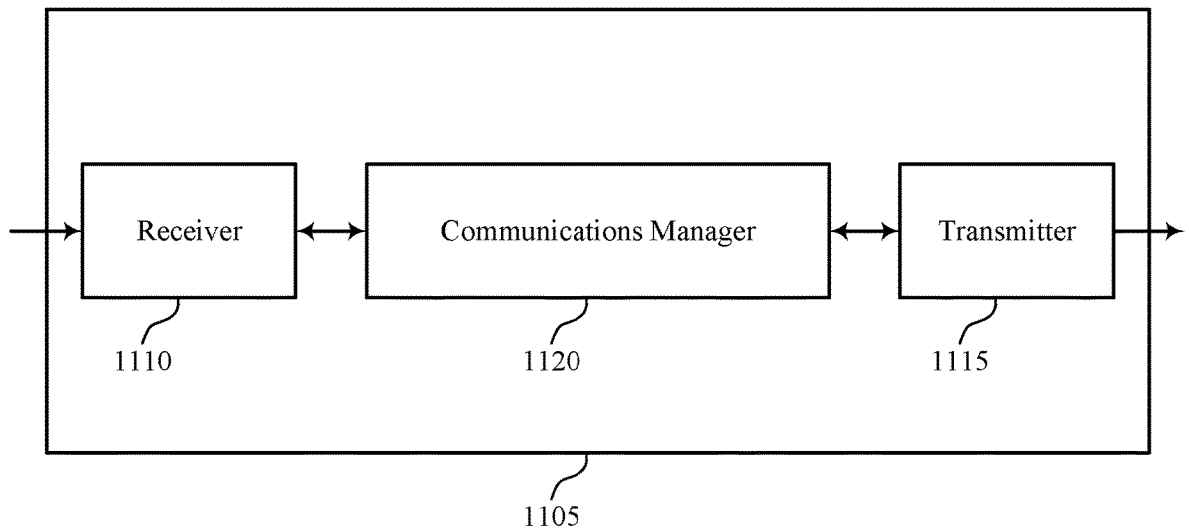
FIGS. 11 and 12 show block diagrams of devices that support techniques for beam shaping for in-band interference mitigation in large bandwidth millimeter wave systems in accordance with aspects of the present disclosure.

FIG. 11 shows a block diagram 1100 of a device 1105 that supports techniques for beam shaping for in-band interference mitigation in large bandwidth millimeter wave systems in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for beam shaping for in-band interference mitigation in large bandwidth millimeter wave systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for beam shaping for in-band interference mitigation in large bandwidth millimeter wave systems). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for beam shaping for in-band interference mitigation in large bandwidth millimeter wave systems as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first base station in accordance with examples as disclosed herein. For example, the communications manager 1120 may be configured as or otherwise support a means for receiving, from a set of multiple UEs, a set of multiple uplink signals including feedback information for the set of multiple UEs, where a first UE of the set of multiple UEs is associated with the first base station and a second UE of the set of multiple UEs is associated with a second base station. In some cases, the first base station may be the same as the second base station, while in some other cases, the first base station may be different from the second base station. The communications manager 1120 may be configured as or otherwise support a means for modifying a set of multiple sets of beam weights for a set of multiple downlink signals, each modified set of beam weights of the set of multiple sets of beam weights corresponding to a respective downlink signal of the set of multiple downlink signals. The communications manager 1120 may be configured as or otherwise support a means for transmitting, to the first UE, a first downlink signal of the set of multiple downlink signals using a first modified set of beam weights of the of the set of multiple sets of beam weights.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved signal decoding reliability and reduced power consumption.

Figure 12:
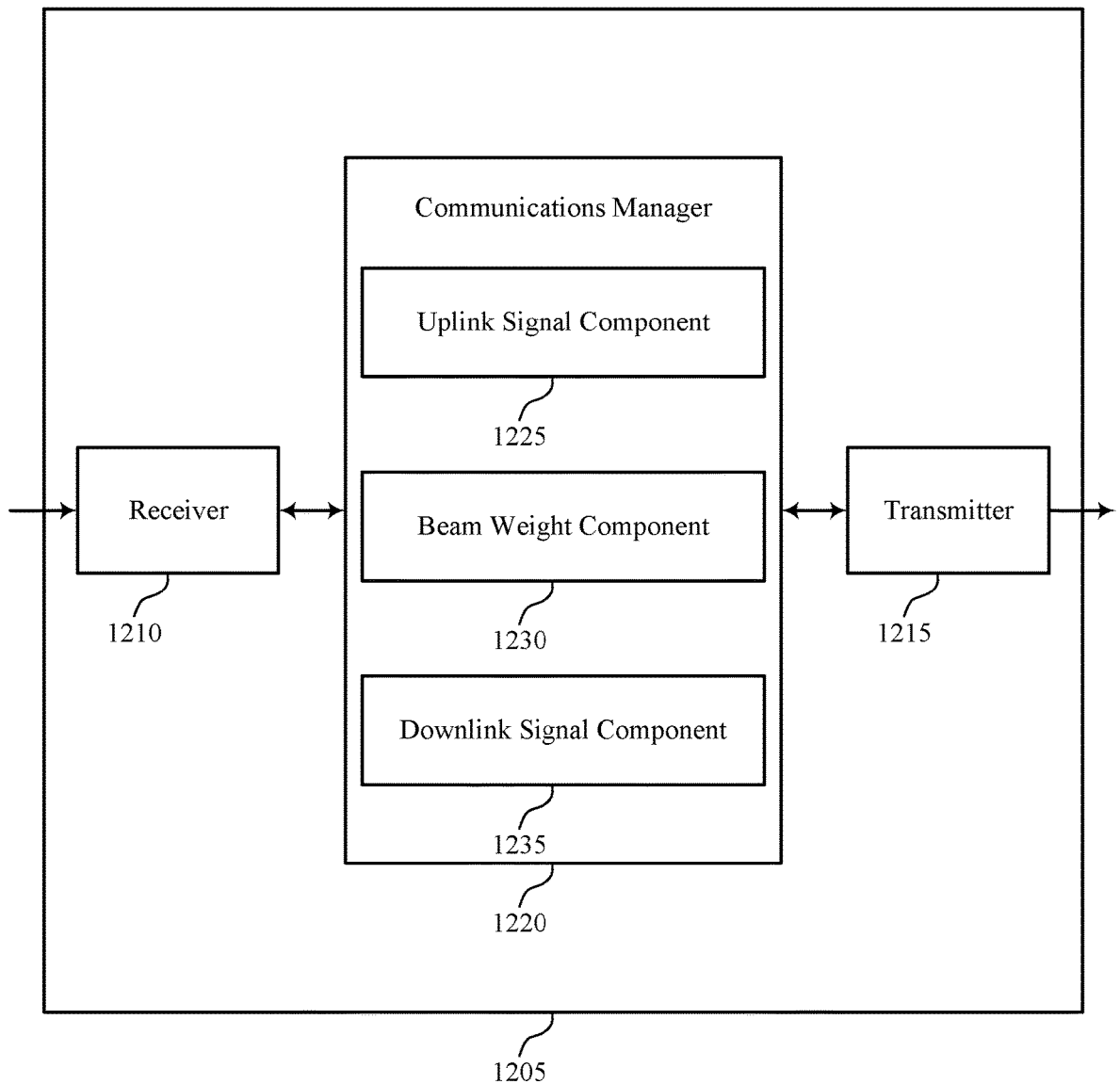

FIG. 12 shows a block diagram 1200 of a device 1205 that supports techniques for beam shaping for in-band interference mitigation in large bandwidth millimeter wave systems in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for beam shaping for in-band interference mitigation in large bandwidth millimeter wave systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for beam shaping for in-band interference mitigation in large bandwidth millimeter wave systems). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for beam shaping for in-band interference mitigation in large bandwidth millimeter wave systems as described herein. For example, the communications manager 1220 may include an uplink signal component 1225, a beam weight component 1230, a downlink signal component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first base station in accordance with examples as disclosed herein. The uplink signal component 1225 may be configured as or otherwise support a means for receiving, from a set of multiple UEs, a set of multiple uplink signals including feedback information for the set of multiple UEs, where a first UE of the set of multiple UEs is associated with the first base station and a second UE of the set of multiple UEs is associated with a second base station. The beam weight component 1230 may be configured as or otherwise support a means for modifying a set of multiple sets of beam weights for a set of multiple downlink signals, each modified set of beam weights of the set of multiple sets of beam weights corresponding to a respective downlink signal of the set of multiple downlink signals. The downlink signal component 1235 may be configured as or otherwise support a means for transmitting, to the first UE, a first downlink signal of the set of multiple downlink signals using a first modified set of beam weights of the of the set of multiple sets of beam weights.

Figure 13:
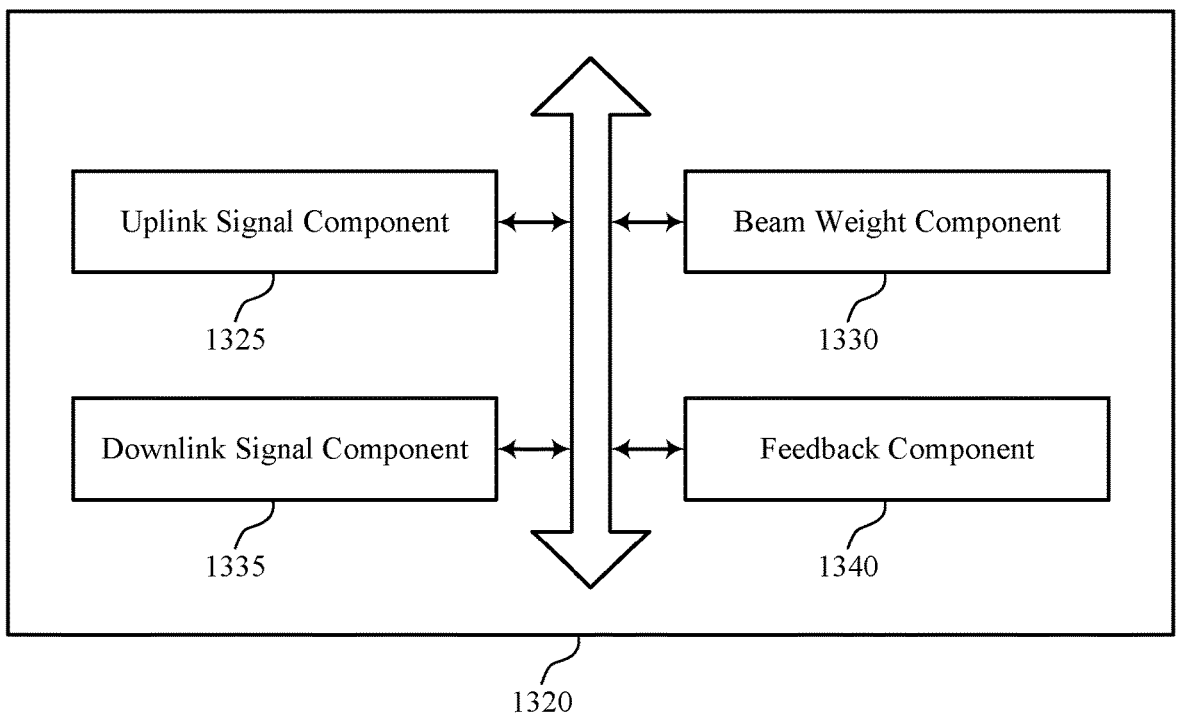
FIG. 13 shows a block diagram of a communications manager that supports techniques for beam shaping for in-band interference mitigation in large bandwidth millimeter wave systems in accordance with aspects of the present disclosure.

FIG. 13 shows a block diagram 1300 of a communications manager 1320 that supports techniques for beam shaping for in-band interference mitigation in large bandwidth millimeter wave systems in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for beam shaping for in-band interference mitigation in large bandwidth millimeter wave systems as described herein. For example, the communications manager 1320 may include an uplink signal component 1325, a beam weight component 1330, a downlink signal component 1335, a feedback component 1340, or any combination thereof. Each of these components may communicate, directly or indirectly, with one another (e.g., via one or more buses).

The communications manager 1320 may support wireless communication at a first base station in accordance with examples as disclosed herein. The uplink signal component 1325 may be configured as or otherwise support a means for receiving, from a set of multiple UEs, a set of multiple uplink signals including feedback information for the set of multiple UEs, where a first UE of the set of multiple UEs is associated with the first base station and a second UE of the set of multiple UEs is associated with a second base station. The beam weight component 1330 may be configured as or otherwise support a means for modifying a set of multiple sets of beam weights for a set of multiple downlink signals, each modified set of beam weights of the set of multiple sets of beam weights corresponding to a respective downlink signal of the set of multiple downlink signals. The downlink signal component 1335 may be configured as or otherwise support a means for transmitting, to the first UE, a first downlink signal of the set of multiple downlink signals using a first modified set of beam weights of the of the set of multiple sets of beam weights.

In some examples, the feedback component 1340 may be configured as or otherwise support a means for transmitting, to one or more UEs of the set of multiple UEs, a first feedback information request signal, where receiving the set of multiple uplink signals including the feedback information is based on the first feedback information request signal.

In some examples, the feedback component 1340 may be configured as or otherwise support a means for transmitting, to the second base station, a second feedback information request signal associated with one or more UEs of the set of multiple UEs, where receiving the set of multiple uplink signals including the feedback information is based on the second feedback information request signal.

In some examples, the beam weight component 1330 may be configured as or otherwise support a means for determining an angle of arrival spread corresponding to a dominant cluster or path of a first uplink signal of the set of multiple uplink signals, where modifying the set of multiple sets of beam weights is based on the angle of arrival spread, and where modifying the set of multiple sets of beam weights includes mitigating a side lobe level associated with an interference condition associated with the second UE of the set of multiple UEs.

In some examples, the beam weight component 1330 may be configured as or otherwise support a means for determining, based on the feedback information, an interference condition associated with the second UE of the set of multiple UEs, where modifying the set of multiple sets of beam weights is based on the interference condition, and where modifying the set of multiple sets of beam weights includes mitigating a side lobe level associated with the interference condition.

In some examples, the uplink signal component 1325 may be configured as or otherwise support a means for receiving, from the first UE of the set of multiple UEs, a first uplink signal of the set of multiple signals in a radio frequency spectrum band. In some examples, the uplink signal component 1325 may be configured as or otherwise support a means for receiving, from the second UE of the set of multiple UEs, a second uplink signal of the set of multiple signals in the radio frequency spectrum band. In some examples, the uplink signal component 1325 may receive, from the first UE of the set of multiple UEs, a first uplink signal of the set of multiple uplink signals in a radio frequency spectrum region. In some examples, the uplink signal component 1325 may receive, from the second UE of the set of multiple UEs, a second uplink signal of the set of multiple of uplink signals in the radio frequency spectrum.

In some examples, the feedback information includes an SINR corresponding to at least one UE of the set of multiple UEs. In some examples, the feedback information includes location information corresponding to at least one UE of the set of multiple UEs. In some examples, the set of multiple uplink signals include at least one beam change request.

Figure 14:
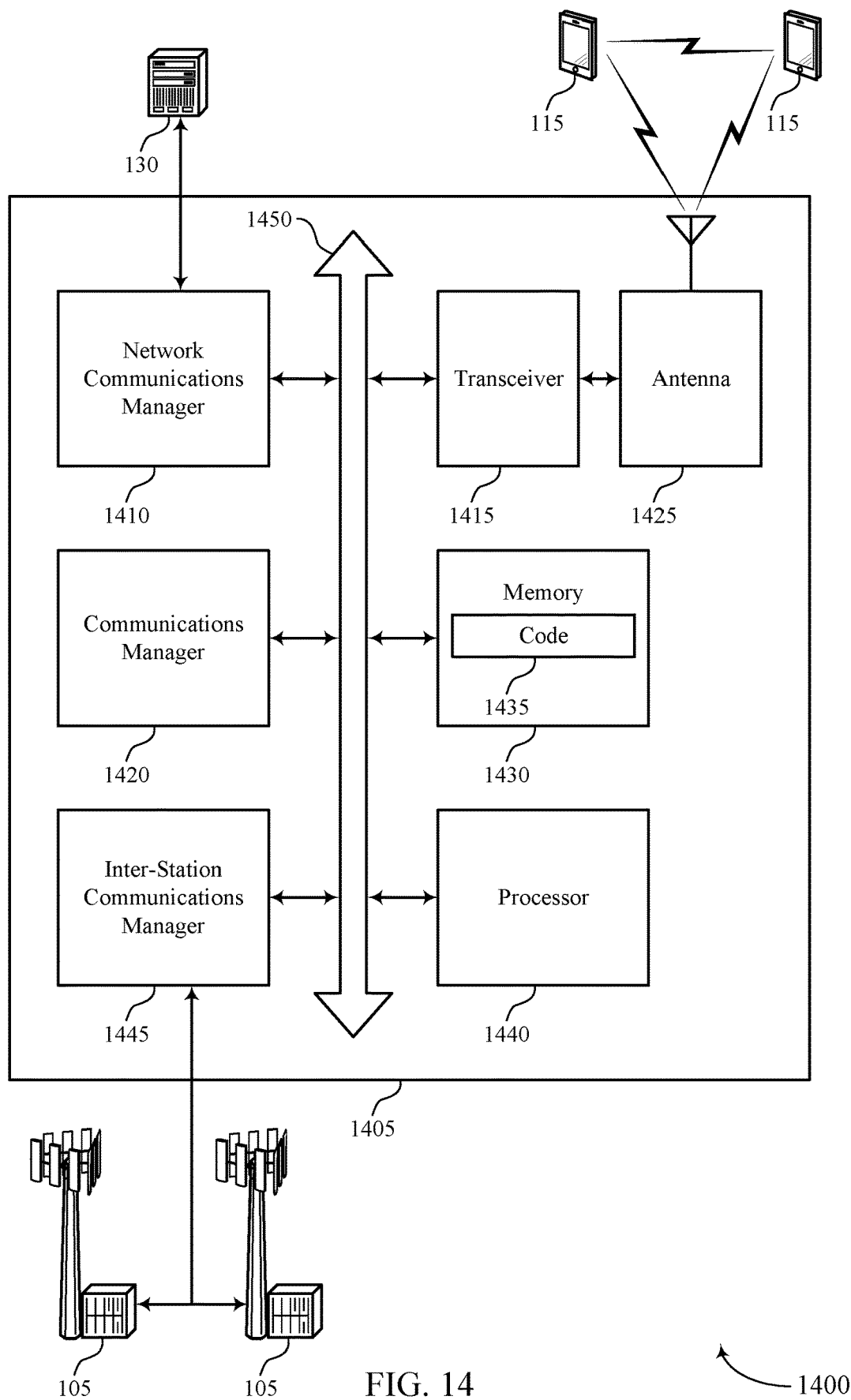
FIG. 14 shows a diagram of a system including a device that supports techniques for beam shaping for in-band interference mitigation in large bandwidth millimeter wave systems in accordance with aspects of the present disclosure.

FIG. 14 shows a diagram of a system 1400 including a device 1405 that supports techniques for beam shaping for in-band interference mitigation in large bandwidth millimeter wave systems in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for beam shaping for in-band interference mitigation in large bandwidth millimeter wave systems). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a first base station in accordance with examples as disclosed herein. For example, the communications manager 1420 may be configured as or otherwise support a means for receiving, from a set of multiple UEs, a set of multiple uplink signals including feedback information for the set of multiple UEs, where a first UE of the set of multiple UEs is associated with the first base station and a second UE of the set of multiple UEs is associated with a second base station. The communications manager 1420 may be configured as or otherwise support a means for modifying a set of multiple sets of beam weights for a set of multiple downlink signals, each modified set of beam weights of the set of multiple sets of beam weights corresponding to a respective downlink signal of the set of multiple downlink signals. The communications manager 1420 may be configured as or otherwise support a means for transmitting, to the first UE, a first downlink signal of the set of multiple downlink signals using a first modified set of beam weights of the of the set of multiple sets of beam weights.

By including or configuring the communications manager 1420 in accordance with examples as described herein, the device 1405 may support techniques for improved communication reliability, reduced power consumption, and reduced latency.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for beam shaping for in-band interference mitigation in large bandwidth millimeter wave systems as described herein, or the processor 1440 and the memory 1430 may be otherwise configured to perform or support such operations.

Figure 15:
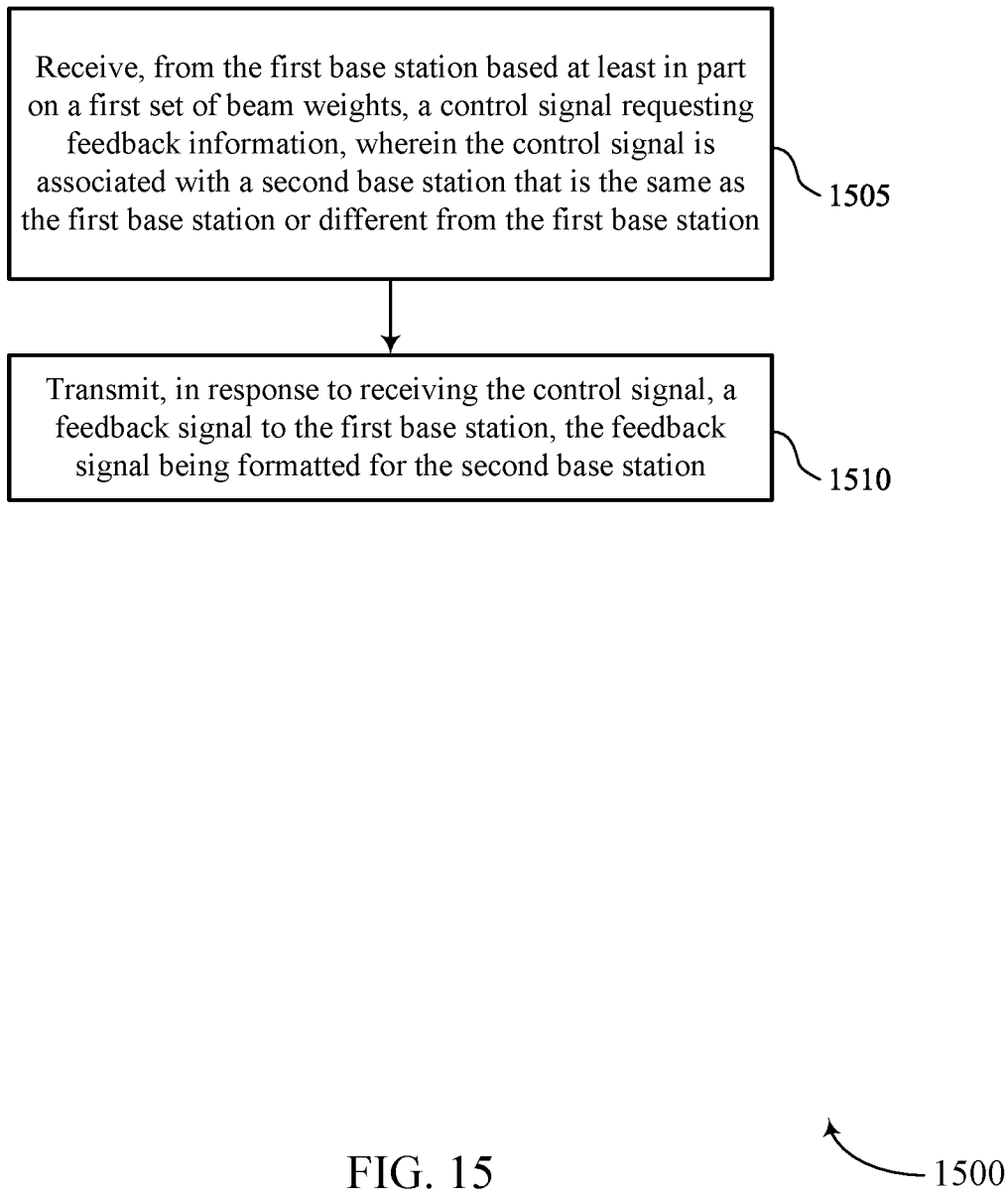
FIGS. 15 through 18 show flowcharts illustrating methods that support techniques for beam shaping for in-band interference mitigation in large bandwidth millimeter wave systems in accordance with aspects of the present disclosure.

FIG. 15 shows a flowchart illustrating a method 1500 that supports techniques for beam shaping for in-band interference mitigation in large bandwidth millimeter wave systems in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from the first base station based on a first set of beam weights, a control signal requesting feedback information, where the control signal is associated with a second base station. The operations of 1505 may be performed in accordance with examples as disclosed herein. In some examples, aspects of the operations of 1505 may be performed by a control signal manager 925 as described with reference to FIG. 9.

At 1510, the method may include transmitting, in response to receiving the control signal, a feedback signal to the first base station, the feedback signal being associated with the second base station. The operations of 1510 may be performed in accordance with examples as disclosed herein. In some examples, aspects of the operations of 1510 may be performed by a feedback signal manager 930 as described with reference to FIG. 9.

Figure 16:
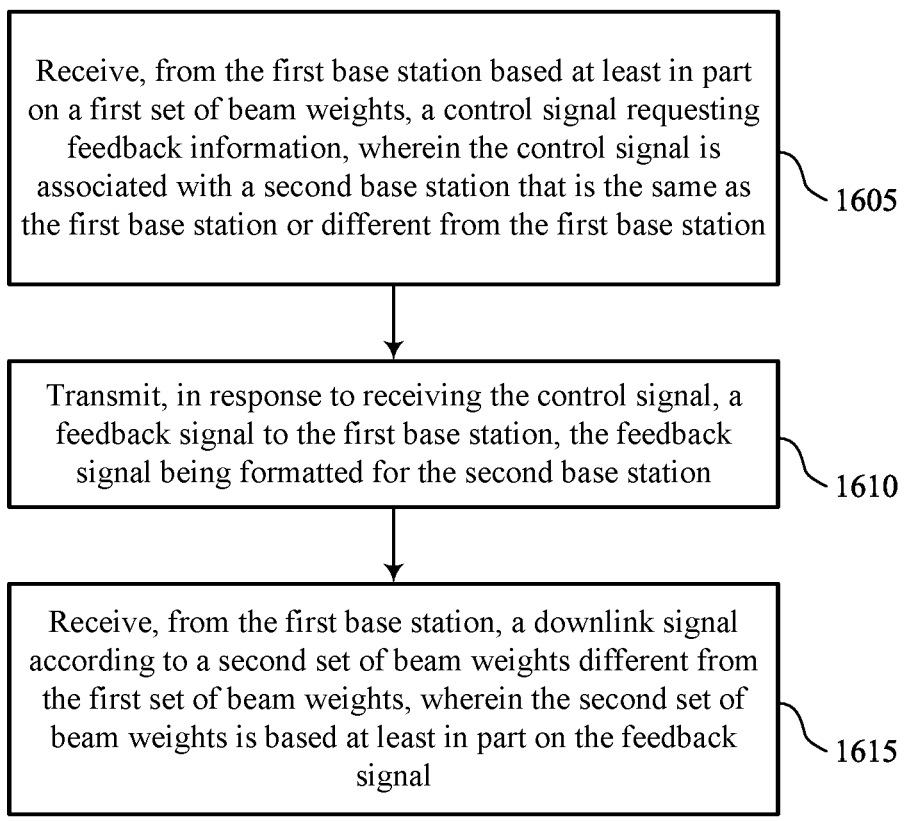

FIG. 16 shows a flowchart illustrating a method 1600 that supports techniques for beam shaping for in-band interference mitigation in large bandwidth millimeter wave systems in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from the first base station based on a first set of beam weights, a control signal requesting feedback information, where the control signal is associated with a second base station. The operations of 1605 may be performed in accordance with examples as disclosed herein. In some examples, aspects of the operations of 1605 may be performed by a control signal manager 925 as described with reference to FIG. 9.

At 1610, the method may include transmitting, in response to receiving the control signal, a feedback signal to the first base station, the feedback signal being associated with the second base station. The operations of 1610 may be performed in accordance with examples as disclosed herein. In some examples, aspects of the operations of 1610 may be performed by a feedback signal manager 930 as described with reference to FIG. 9.

At 1615, the method may include receiving, from the first base station, a downlink signal according to a second set of beam weights different from the first set of beam weights, where the second set of beam weights is based on the feedback signal. The operations of 1615 may be performed in accordance with examples as disclosed herein. In some examples, aspects of the operations of 1615 may be performed by a downlink signal manager 935 as described with reference to FIG. 9.

Figure 17:
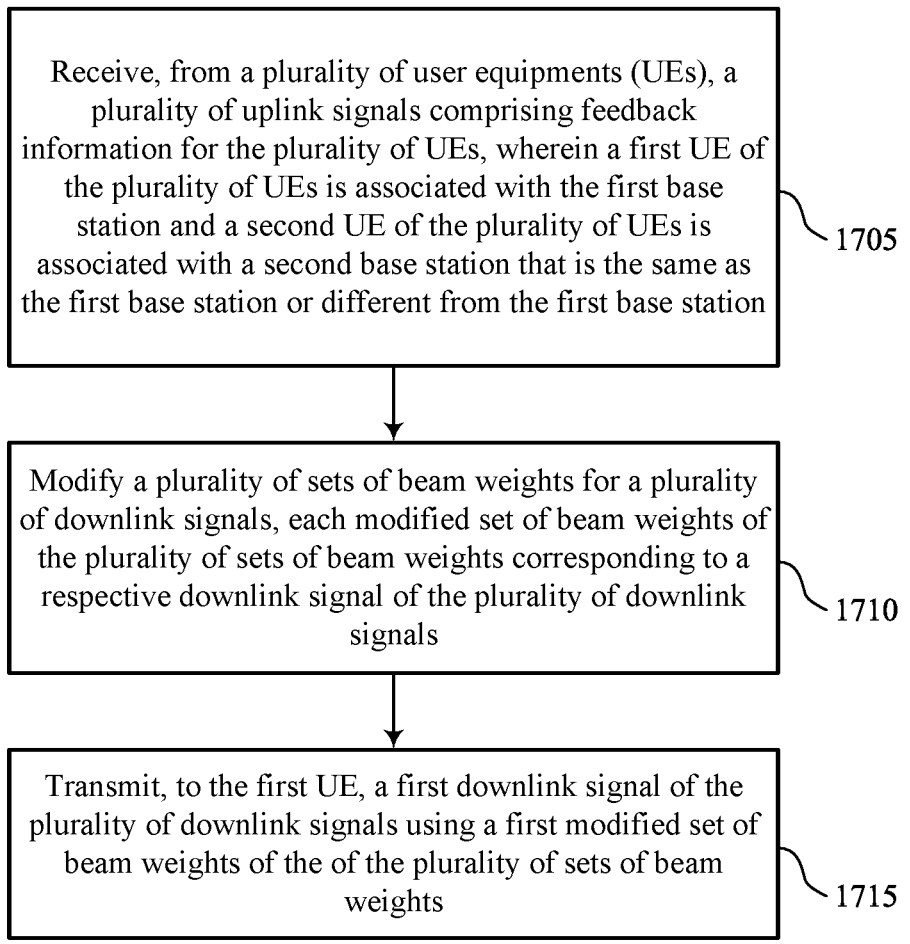

FIG. 17 shows a flowchart illustrating a method 1700 that supports techniques for beam shaping for in-band interference mitigation in large bandwidth millimeter wave systems in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include receiving, from a set of multiple UEs, a set of multiple uplink signals including feedback information for the set of multiple UEs, where a first UE of the set of multiple UEs is associated with the first base station and a second UE of the set of multiple UEs is associated with a second base station. The operations of 1705 may be performed in accordance with examples as disclosed herein. In some examples, aspects of the operations of 1705 may be performed by an uplink signal component 1325 as described with reference to FIG. 13.

At 1710, the method may include modifying a set of multiple sets of beam weights for a set of multiple downlink signals, each modified set of beam weights of the set of multiple sets of beam weights corresponding to a respective downlink signal of the set of multiple downlink signals. The operations of 1710 may be performed in accordance with examples as disclosed herein. In some examples, aspects of the operations of 1710 may be performed by a beam weight component 1330 as described with reference to FIG. 13.

At 1715, the method may include transmitting, to the first UE, a first downlink signal of the set of multiple downlink signals using a first modified set of beam weights of the of the set of multiple sets of beam weights. The operations of 1715 may be performed in accordance with examples as disclosed herein. In some examples, aspects of the operations of 1715 may be performed by a downlink signal component 1335 as described with reference to FIG. 13.

Figure 18:
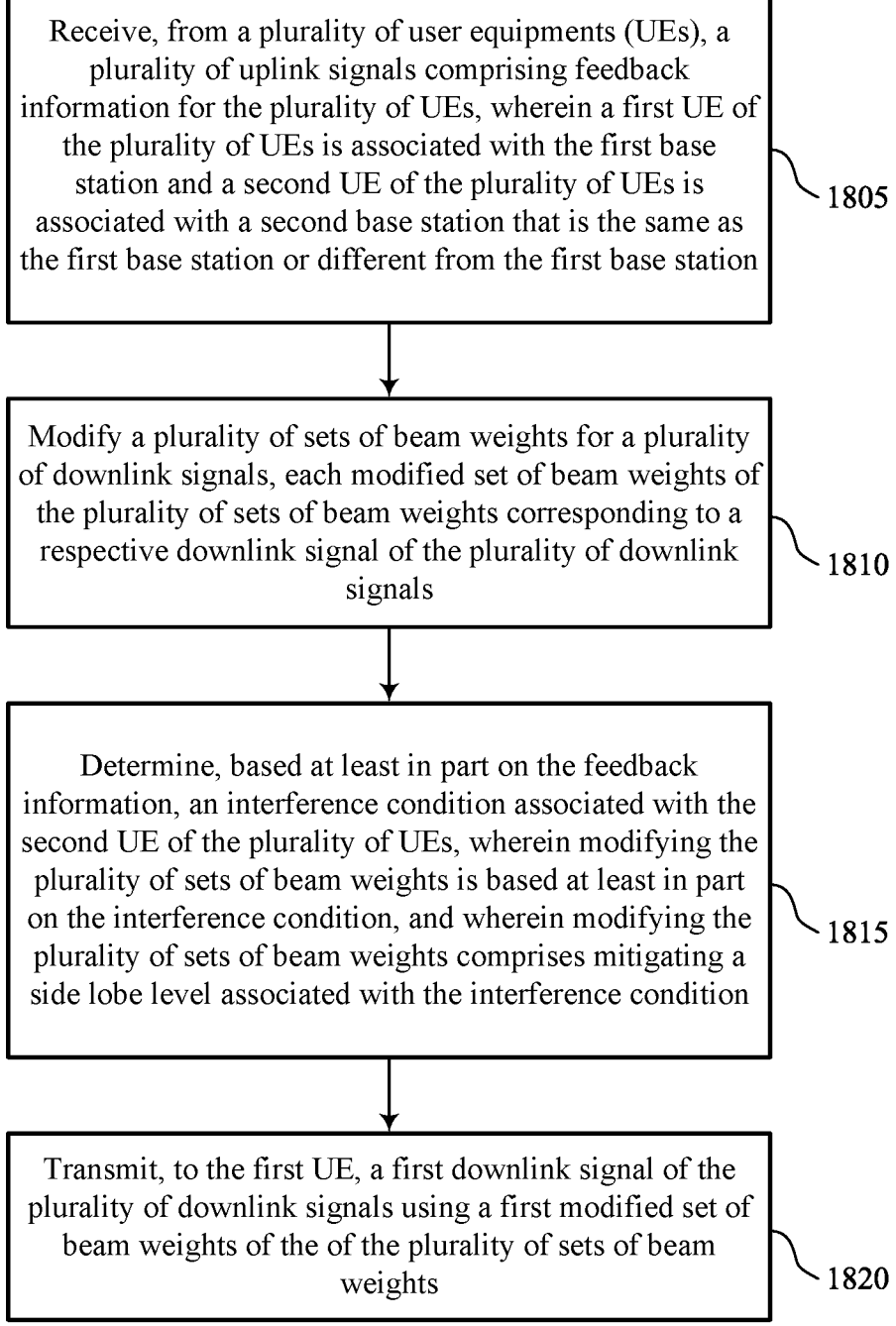

FIG. 18 shows a flowchart illustrating a method 1800 that supports techniques for beam shaping for in-band interference mitigation in large bandwidth millimeter wave systems in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include receiving, from a set of multiple UEs, a set of multiple uplink signals including feedback information for the set of multiple UEs, where a first UE of the set of multiple UEs is associated with the first base station and a second UE of the set of multiple UEs is associated with a second base station. The operations of 1805 may be performed in accordance with examples as disclosed herein. In some examples, aspects of the operations of 1805 may be performed by an uplink signal component 1325 as described with reference to FIG. 13.

At 1810, the method may include modifying a set of multiple sets of beam weights for a set of multiple downlink signals, each modified set of beam weights of the set of multiple sets of beam weights corresponding to a respective downlink signal of the set of multiple downlink signals. The operations of 1810 may be performed in accordance with examples as disclosed herein. In some examples, aspects of the operations of 1810 may be performed by a beam weight component 1330 as described with reference to FIG. 13.

At 1815, the method may include determining, based on the feedback information, an interference condition associated with the second UE of the set of multiple UEs, where modifying the set of multiple sets of beam weights is based on the interference condition, and where modifying the set of multiple sets of beam weights includes mitigating a side lobe level associated with the interference condition. The operations of 1815 may be performed in accordance with examples as disclosed herein. In some examples, aspects of the operations of 1820 may be performed by a beam weight component 1330 as described with reference to FIG. 13.

At 1820, the method may include transmitting, to the first UE, a first downlink signal of the set of multiple downlink signals using a first modified set of beam weights of the of the set of multiple sets of beam weights. The operations of 1820 may be performed in accordance with examples as disclosed herein. In some examples, aspects of the operations of 1815 may be performed by a downlink signal component 1335 as described with reference to FIG. 13.

SUMMARY OF ASPECTS

The following provides an overview of aspects of the present disclosure:

Aspect 1: A method for wireless communication at a user equipment (UE) associated with a first base station, comprising: receiving, from the first base station based at least in part on a first set of beam weights, a control signal requesting feedback information, wherein the control signal is associated with a second base station; and transmitting, in response to receiving the control signal, a feedback signal to the first base station, the feedback signal being associated with the second base station.

Aspect 2: The method of aspect 1, further comprising: receiving, from the first base station, a downlink signal according to a second set of beam weights different from the first set of beam weights, wherein the second set of beam weights is based at least in part on the feedback signal.

Aspect 3: The method of any of aspects 1 through 2, further comprising: determining a signal to interference and noise ratio (SINR), wherein the feedback signal comprises the SINR.

Aspect 4: The method of any of aspects 1 through 3, further comprising: determining location information corresponding to the UE, wherein the feedback signal comprises the location information.

Aspect 5: The method of aspect 4, further comprising: receiving, from the first base station, a global navigation satellite systems (GNSS) signal, wherein the location information is based at least in part on the GNSS signal.

Aspect 6: The method of any of aspects 4 through 5, further comprising: receiving, from the first base station, a terrestrial beacon system (TBS) signal, wherein the location information is based at least in part on the TBS signal.

Aspect 7: A method for wireless communication at a first base station, comprising: receiving, from a plurality of UEs, a plurality of uplink signals comprising feedback information for the plurality of UEs, wherein a first UE of the plurality of UEs is associated with the first base station and a second UE of the plurality of UEs is associated with a second base station; modifying a plurality of sets of beam weights for a plurality of downlink signals, each modified set of beam weights of the plurality of sets of beam weights corresponding to a respective downlink signal of the plurality of downlink signals; and transmitting, to the first UE, a first downlink signal of the plurality of downlink signals using a first modified set of beam weights of the of the plurality of sets of beam weights.

Aspect 8: The method of aspect 7, further comprising: transmitting, to one or more UEs of the plurality of UEs, a first feedback information request signal, wherein receiving the plurality of uplink signals comprising the feedback information is based at least in part on the first feedback information request signal.

Aspect 9: The method of any of aspects 7 through 8, further comprising: transmitting, to the second base station, a second feedback information request signal associated with one or more UEs of the plurality of UEs, wherein receiving the plurality of uplink signals comprising the feedback information is based at least in part on the second feedback information request signal.

Aspect 10: The method of any of aspects 7 through 9, further comprising: determining an angle of arrival spread corresponding to a dominant cluster or path of a first uplink signal of the plurality of uplink signals, wherein modifying the plurality of sets of beam weights is based at least in part on the angle of arrival spread, and wherein modifying the plurality of sets of beam weights comprises mitigating a side lobe level associated with an interference condition associated with the second UE of the plurality of UEs.

Aspect 11: The method of any of aspects 7 through 10, further comprising: determining, based at least in part on the feedback information, an interference condition associated with the second UE of the plurality of UEs, wherein modifying the plurality of sets of beam weights is based at least in part on the interference condition, and wherein modifying the plurality of sets of beam weights comprises mitigating a side lobe level associated with the interference condition.

Aspect 12: The method of any of aspects 7 through 11, further comprising: receiving, from the first UE of the plurality of UEs, a first uplink signal of the plurality of uplink signals in a radio frequency spectrum region; and receiving, from the second UE of the plurality of UEs, a second uplink signal of the plurality of uplink signals in the radio frequency spectrum region.

Aspect 13: The method of any of aspects 7 through 12, wherein the feedback information comprises an SINK corresponding to at least one UE of the plurality of UEs.

Aspect 14: The method of any of aspects 7 through 13, wherein the feedback information comprises location information corresponding to at least one UE of the plurality of UEs.

Aspect 15: The method of any of aspects 7 through 14, wherein the plurality of uplink signals comprise at least one beam change request.

Aspect 16: An apparatus for wireless communication at a UE associated with a first base station, comprising a processor; memory coupled with the processor; and instructions stored in the memory and executable by the processor to cause the apparatus to perform a method of any of aspects 1 through 6.

Aspect 17: An apparatus for wireless communication at a UE associated with a first base station, comprising at least one means for performing a method of any of aspects 1 through 6.

Aspect 18: A non-transitory computer-readable medium storing code for wireless communication at a UE associated with a first base station, the code comprising instructions executable by a processor to perform a method of any of aspects 1 through 6.

Aspect 19: An apparatus for wireless communication at a first base station, comprising a processor; memory coupled with the processor; and instructions stored in the memory and executable by the processor to cause the apparatus to perform a method of any of aspects 7 through 15.

Aspect 20: An apparatus for wireless communication at a first base station, comprising at least one means for performing a method of any of aspects 7 through 15.

Aspect 21: A non-transitory computer-readable medium storing code for wireless communication at a first base station, the code comprising instructions executable by a processor to perform a method of any of aspects 7 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE) associated with a first network device, comprising:
receiving, from the first network device based at least in part on a first set of beam weights, a control signal requesting feedback information, wherein the control signal is associated with a second network device; and
transmitting, to the first network device in response to receiving the control signal, a feedback signal comprising a signal to interference and noise ratio (SINR) and location information for the UE, the feedback signal being associated with the second network device.

2. The method of claim 1, further comprising:
receiving, from the first network device, a downlink signal according to a second set of beam weights different from the first set of beam weights, wherein the second set of beam weights is based at least in part on the feedback signal.

3. The method of claim 1, further comprising:
receiving, from the first network device, a global navigation satellite systems (GNSS) signal, wherein the location information is based at least in part on the GNSS signal.

4. The method of claim 1, further comprising:
receiving, from the first network device, a terrestrial beacon system (TBS) signal, wherein the location information is based at least in part on the TBS signal.

5. The method of claim 1, wherein the feedback signal is associated with the second network device in accordance with the feedback signal being generated based at least in part on a downlink signal received from the second network device.

6. A method for wireless communication at a first network device, comprising:
receiving, from a plurality of user equipments (UEs), a plurality of uplink signals comprising feedback information for the plurality of UEs, the feedback information comprising a signal to interference and noise ratio (SINR) and location information for each UE of the plurality of UEs, wherein a first UE of the plurality of UEs is associated with the first network device and a second UE of the plurality of UEs is associated with a second network device;
modifying, based at least in part on the feedback information comprising the SINR and the location information for each UE of the plurality of UEs, a plurality of sets of beam weights for a plurality of downlink signals, each modified set of beam weights of the plurality of sets of beam weights corresponding to a respective downlink signal of the plurality of downlink signals; and
transmitting, to the first UE, a first downlink signal of the plurality of downlink signals using a first modified set of beam weights of the plurality of sets of beam weights.

7. The method of claim 6, further comprising:
transmitting, to one or more UEs of the plurality of UEs, a first feedback information request signal, wherein receiving the plurality of uplink signals comprising the feedback information is based at least in part on the first feedback information request signal.

8. The method of claim 6, further comprising:
transmitting, to the second network device, a second feedback information request signal associated with one or more UEs of the plurality of UEs, wherein receiving the plurality of uplink signals comprising the feedback information is based at least in part on the second feedback information request signal.

9. The method of claim 6, further comprising:
determining an angle of arrival spread corresponding to a dominant cluster or path of a first uplink signal of the plurality of uplink signals, wherein modifying the plurality of sets of beam weights is based at least in part on the angle of arrival spread, and wherein modifying the plurality of sets of beam weights comprises mitigating a side lobe level associated with an interference condition associated with the second UE of the plurality of UEs.

10. The method of claim 6, further comprising:
determining, based at least in part on the feedback information, an interference condition associated with the second UE of the plurality of UEs, wherein modifying the plurality of sets of beam weights is based at least in part on the interference condition, and wherein modifying the plurality of sets of beam weights comprises mitigating a side lobe level associated with the interference condition.

11. The method of claim 6, further comprising:
receiving, from the first UE of the plurality of UEs, a first uplink signal of the plurality of uplink signals in a radio frequency spectrum region; and
receiving, from the second UE of the plurality of UEs, a second uplink signal of the plurality of uplink signals in the radio frequency spectrum region.

12. The method of claim 6, wherein the plurality of uplink signals comprise at least one beam change request.

13. An apparatus for wireless communication at a user equipment (UE) associated with a first network device, comprising:
a processor;
memory coupled with the processor; and
instructions stored in the memory and executable by the processor to cause the apparatus to:
receive, from the first network device based at least in part on a first set of beam weights, a control signal requesting feedback information, wherein the control signal is associated with a second network device; and
transmit, to the first network device in response to receiving the control signal, a feedback signal comprising a signal to interference and noise ratio (SINR) and location information for the UE, the feedback signal being associated with the second network device.

14. The apparatus of claim 13, wherein the instructions are further executable by the processor to cause the apparatus to:
receive, from the first network device, a downlink signal according to a second set of beam weights different from the first set of beam weights, wherein the second set of beam weights is based at least in part on the feedback signal.

15. The apparatus of claim 13, wherein the instructions are further executable by the processor to cause the apparatus to:
receive, from the first network device, a global navigation satellite systems (GNSS) signal, wherein the location information is based at least in part on the GNSS signal.

16. The apparatus of claim 13, wherein the instructions are further executable by the processor to cause the apparatus to:
receive, from the first network device, a terrestrial beacon system (TBS) signal, wherein the location information is based at least in part on the TBS signal.

17. An apparatus for wireless communication at a first network device, comprising:
a processor;
memory coupled with the processor; and
instructions stored in the memory and executable by the processor to cause the apparatus to:
receive, from a plurality of user equipments (UEs), a plurality of uplink signals comprising feedback information for the plurality of UEs, wherein a first UE of the plurality of UEs is associated with the first network device and a second UE of the plurality of UEs is associated with a second network device;
modify a plurality of sets of beam weights for a plurality of downlink signals, each modified set of beam weights of the plurality of sets of beam weights corresponding to a respective downlink signal of the plurality of downlink signals; and
transmit, to the first UE, a first downlink signal of the plurality of downlink signals using a first modified set of beam weights of the plurality of sets of beam weights.

18. The apparatus of claim 17, wherein the instructions are further executable by the processor to cause the apparatus to:
transmit, to one or more UEs of the plurality of UEs, a first feedback information request signal, wherein receiving the plurality of uplink signals comprising the feedback information is based at least in part on the first feedback information request signal.

19. The apparatus of claim 17, wherein the instructions are further executable by the processor to cause the apparatus to:
transmit, to the second network device, a second feedback information request signal associated with one or more UEs of the plurality of UEs, wherein receiving the plurality of uplink signals comprising the feedback information is based at least in part on the second feedback information request signal.

20. The apparatus of claim 17, wherein the instructions are further executable by the processor to cause the apparatus to:
determine an angle of arrival spread corresponding to a dominant cluster or path of a first uplink signal of the plurality of uplink signals, wherein modifying the plurality of sets of beam weights is based at least in part on the angle of arrival spread, and wherein modifying the plurality of sets of beam weights comprises mitigating a side lobe level associated with an interference condition associated with the second UE of the plurality of UEs.

21. The apparatus of claim 17, wherein the instructions are further executable by the processor to cause the apparatus to:
determine, based at least in part on the feedback information, an interference condition associated with the second UE of the plurality of UEs, wherein modifying the plurality of sets of beam weights is based at least in part on the interference condition, and wherein modifying the plurality of sets of beam weights comprises mitigating a side lobe level associated with the interference condition.

22. The apparatus of claim 17, wherein the instructions are further executable by the processor to cause the apparatus to:
receive, from the first UE of the plurality of UEs, a first uplink signal of the plurality of uplink signals in a radio frequency spectrum region; and
receive, from the second UE of the plurality of UEs, a second uplink signal of the plurality of uplink signals in the radio frequency spectrum region.

23. The apparatus of claim 17, wherein the plurality of uplink signals comprise at least one beam change request.

* * * * *